United States Patent
Patil et al.

(10) Patent No.: US 11,497,074 B2
(45) Date of Patent: Nov. 8, 2022

(54) MULTI-LINK BLOCK ACKNOWLEDGMENT (BA)

(71) Applicant: QUALCOMM Incorporated, San Diego, CA (US)

(72) Inventors: Abhishek Pramod Patil, San Diego, CA (US); Sai Yiu Duncan Ho, San Diego, CA (US); George Cherian, San Diego, CA (US); Alfred Asterjadhi, San Diego, CA (US); Lochan Verma, Danville, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/142,196

(22) Filed: Jan. 5, 2021

(65) Prior Publication Data

US 2021/0212142 A1 Jul. 8, 2021

Related U.S. Application Data

(60) Provisional application No. 62/957,768, filed on Jan. 6, 2020.

(51) Int. Cl.
*H04W 76/15* (2018.01)
*H04L 1/18* (2006.01)
(Continued)

(52) U.S. Cl.
CPC ........... *H04W 76/15* (2018.02); *H04L 1/1621* (2013.01); *H04L 1/189* (2013.01); *H04W 80/02* (2013.01)

(58) Field of Classification Search
CPC ..... H04W 76/15; H04W 80/02; H04W 84/12; H04L 1/1621; H04L 1/189; H04L 1/188;
(Continued)

(56) References Cited

U.S. PATENT DOCUMENTS

2008/0226074 A1* 9/2008 Sammour ........... H04W 12/033
380/270
2008/0285566 A1* 11/2008 Sammour ............. H04L 1/1887
370/394
(Continued)

OTHER PUBLICATIONS

Chitrakar R., et al., (Panasonic): "Multi-Link Acknowledgment," IEEE Draft; 11-19-1512-06-00BE-Multi-Link-Acknowledgment, IEEE-SA Mentor, Piscataway, NJ USA, vol. 802.11 EHT; 802.11be, No. 6, Nov. 14, 2019 (Nov. 14, 2019), pp. 1-16, XP068164738, Retrieved from the Internet: URL: https://mentor.ieee.org/802.11/dcn/19/11-19-1512-06-00be-multi-link-acknowledgment.pptx [retrieved on Nov. 14, 2019] the whole document.
(Continued)

*Primary Examiner* — Mandish K Randhawa
(74) *Attorney, Agent, or Firm* — Patterson + Sheridan, LLP

(57) ABSTRACT

One innovative aspect of the subject matter described in this disclosure may be implemented in a method for wireless communication. The method may be performed, for example, by a first multi-link device (MLD), that includes a first station (STA) and a second STA, to generate and provide block acknowledgment (BA) status reports for Medium Access Control (MAC) Protocol Data Units (MPDUs) transmitted by the first STA of the first MLD and the second STA of the first MLD. Another innovative aspect of the subject matter described in this disclosure may be implemented in a method for wireless communication. The method may be performed, for example, by a logical entity of a first MLD to receive and process a BA status report.

30 Claims, 18 Drawing Sheets

(51) Int. Cl.
*H04L 1/16* (2006.01)
*H04W 80/02* (2009.01)

(58) Field of Classification Search
CPC ..... H04L 1/1867; H04L 1/1614; H04L 1/187; H04L 2001/0092
See application file for complete search history.

(56) References Cited

U.S. PATENT DOCUMENTS

2018/0205502 A1* 7/2018 Merlin .................. H04L 5/0053
2020/0037288 A1* 1/2020 Huang ................ H04W 72/005

OTHER PUBLICATIONS

Chitrakar R., et al., (Panasonic): "Multi-Link Transmission", IEEE Draft; 11-19-1128-00-00BE-Multi-Link-Transmission, IEEE-SA Mentor, Piscataway, NJ USA, vol. 802.11 EHT; 802.11be, Jul. 12, 2019 (Jul. 12, 2019), pp. 1-8, XP068152872, Retrieved from the Internet: URL: https://mentor.ieee.org/802.11/dcn/19/11-19-1128-00-00be-multi-link-transmission.pptx [retrieved on Jul. 12, 2019] the whole document.
International Search Report and Written Opinion—PCT/US2021/012316—ISA/EPO—dated Mar. 24, 2021.

* cited by examiner

|  | AP MLD (tight Coordination) | AP MLD (Loose Coordination) |
|---|---|---|
| Client MLD (tight Coordination) | A STA instance of either MLD has complete status of another STA instance of the MLD | STA instance of client MLD has complete status of another STA. AP of an AP MLD has limited or no status of another AP |
| Client MLD (Loose Coordination) | AP instance of an AP MLD has complete status of another AP. STA of client MLD has limited or no status of another STA | A STA instance of either MLD has limited or no status of another STA instance of the MLD |

*Figure 6A*

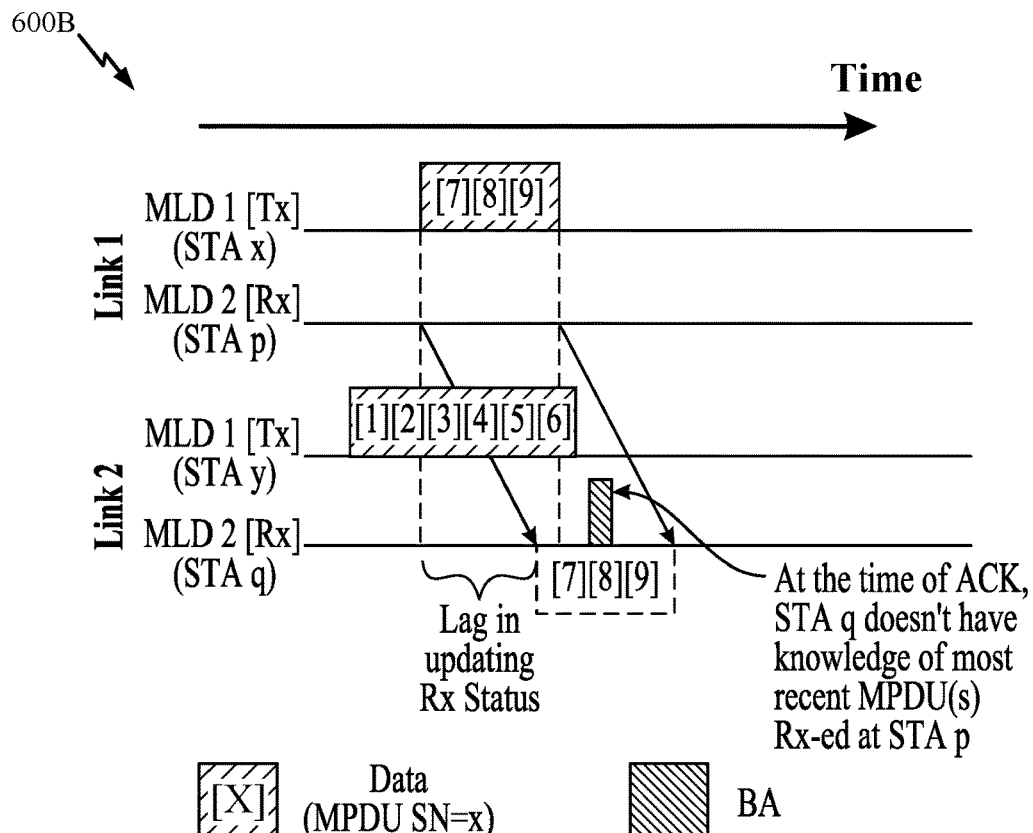

| Order | Information |
|---|---|
| 1 | Category |
| 2 | Block Ack Action |
| 3 | Dialog Token |
| 4 | Block Ack Parameter Set |
| 5 | Block Ack Timeout Value |
| 6 | Block Ack Starting Sequence Control |
| 7 | GCR Group Address Element (optional) |
| 8 | Multi-band (optional) |
| 9 | TCLAS (optional) |
| 10 | ADDBA Extension (Optional) |

| Order | Information |
|---|---|
| 1 | Category |
| 2 | Block Ack Action |
| 3 | Dialog Token |
| 4 | Status Code |
| 5 | Block Ack Parameter Value |
| 6 | Block Ack Timeout Value |
| 7 | GCR Group Address Element (optional) |
| 8 | Multi-band (optional) |
| 9 | TCLAS (optional) |
| 10 | ADDBA Extension (Optional) |
| 11(11ah) | Originator Preferred MCS (Optional) |

*Figure 15B*

ADDBA Capabilities Field Format

MULTI-LINK BLOCK ACKNOWLEDGMENT (BA)

CROSS-REFERENCE TO RELATED APPLICATION(S)

This application claims benefit of and priority to U.S. Provisional Application No. 62/957,768, filed Jan. 6, 2020, herein incorporated by reference in its entirety as if fully set forth below and for all applicable purposes.

TECHNICAL FIELD

This disclosure relates generally to wireless communication, and more specifically, to block acknowledgment (BA) techniques for communications transmitted over multiple links, for example, between multi-link devices (MLDs).

DESCRIPTION OF THE RELATED TECHNOLOGY

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The deployment of wireless local area networks (WLANs, sometimes referred to as Wi-Fi networks) in the home, the office, and various public facilities is commonplace today. Such networks may employ a wireless access point (AP) that connects a number of wireless stations (STAs) in a specific locality (such as the aforementioned home, office, public facility, etc.) to another network, such as the Internet or the like. A set of STAs can communicate with each other through a common AP in what is referred to as a basic service set (BSS).

In order to address issues associated with the increasing bandwidth requirements demanded for wireless communications systems, different schemes are being developed to allow multiple user terminals to communicate with a single access point by sharing the channel resources while achieving high data throughput. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard (including amendments thereto such as 802.11ax, 802.11ay and 802.11be). The IEEE 802.11 standard denotes a set of WLAN physical (PHY) layer and medium access control (MAC) standards developed by the IEEE 802.11 committee for short-range communications (such as tens of meters to a few hundred meters).

Some wireless networks, such as 802.11be networks (also referred to as Extremely High Throughput (EHT) networks), allow devices (which may be referred to as multi-link devices (MLDs)) to communicate via two or more communication links simultaneously, for example, using multi-link aggregation (MLA). The enablement of multi-link communications presents challenges associated with transmission and acknowledgement schemes. Multi-link Operation (MLO) is generally regarded as one of the key features in the upcoming 802.11be standard. It is desirable that the MLO framework account for MLDs with a variety of capabilities. This includes Multi-Link Devices (MLDs) where the STA instances do not have tight coordination between them.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method can be performed, for example, by a first multi-link device (MLD) that includes a first station (STA) and a second STA. The method generally includes transmitting, by the first STA of the first MLD to a third STA of a second MLD via a first wireless link between the first STA and the third STA, one or more first Medium Access Control (MAC) Protocol Data Unit (MPDUs) assigned to the first STA; transmitting, by the second STA of the first MLD to a fourth STA of the second MLD via a second wireless link between the second STA and the fourth STA, one or more second MPDUs assigned to the second STA; receiving, by the first STA of the first MLD from the third STA of the second MLD via the first wireless link, a block acknowledgment (BA) including a first set of one or more bits providing acknowledgment feedback for the one or more first MPDUs assigned to the first STA and a second set of one or more bits providing acknowledgment feedback for the one or more second MPDUs assigned to the second STA; determining a state of each of the one or more first MPDUs assigned to the first STA of the first MLD based on the first set of bits; determining a state of each of the one or more second MPDUs assigned to the second STA of the first MLD based on the second set of bits; generating a BA status report based on the determined states of the one or more first MPDUs assigned to the first STA and the determined states of the one or more second MPDUs assigned to the second STA; and providing the BA status report to a logical entity of the first MLD.

Another innovative aspect of the subject matter described in this disclosure can be implemented in a method for wireless communication. The method can be performed, for example, by a logical entity of a first MLD. The method generally includes assigning a first set of one or more Medium Access Control (MAC) Protocol Data Unit (MPDUs) to a first station (STA) of the first MLD for transmission on a first wireless link between the first STA and a third STA of a second MLD; assigning a second set of one or more MPDUs to a second STA of the first MLD for transmission on a second wireless link between the second STA and a fourth STA of the second MLD; receiving one or more block acknowledgment (BA) status reports from at least one of the first STA or the second STA indicating a state of each MPDU in the first set of one or more MPDUs assigned to the first STA and a state of each MPDU in the second set of one or more MPDUs assigned to the second STA, wherein the state of each MPDU is indicated as a state value selected from one of at least four state values; and updating a common scoreboard used to track the states of the one or more MPDUs in the first set transmitted across the first wireless link and the one or more MPDUs in the second set transmitted across the second wireless link, based on the one or more BA status reports.

In some implementations, the first STA has a policy for retransmitting one or more first MPDUs that have corresponding bits of the first set of bits that indicate negative acknowledgments and the first STA is configured to forward one or more updated BA status reports to the logical entity before exhausting a maximum number of retransmissions according to the policy.

In some implementations, the first STA determines a state of each of the one or more first MPDUs assigned to the first STA based on the first set of bits by determining a state of an MPDU of the one or more first MPDUs assigned to the first STA as successfully received by the second MLD based on a corresponding bit of the first set of bits indicating a positive acknowledgment, determining a state of an MPDU of the one or more first MPDUs assigned to the first STA as pending based on a corresponding bit of the first set of bits indicating a negative acknowledgment and the first STA has yet to transmit the MPDU or is retransmitting the MPDU, and determining a state of an MPDU of the one or more first MPDUs assigned to the first STA as failed based on a corresponding bit of the first set of bits indicating a negative acknowledgment and the first STA has transmitted the MPDU and is retransmitting the MPDU.

In some implementations, the first STA determines a state of each of the one or more second MPDUs assigned to the second STA based on the second set of bits by determining a state of an MPDU of the one or more second MPDUs assigned to the second STA as successfully received by the second MLD based on a corresponding bit of the second set of bits indicating a positive acknowledgment and determining a state of an MPDU of the one or more second MPDUs assigned to the second STA as unknown based on a corresponding bit of the first set of bits indicating a negative acknowledgment.

In some implementations, the logical entity of the first MLD updates the common scoreboard by indicating, in the common scoreboard, that an MPDU of the one or more MPDUS of the first set assigned to the first STA or an MPDU of the one or more MPDUS of the second set assigned to the second STA has been successfully received in response to receiving a BA status report from either the first STA or the second STA indicating the MPDU as successfully received.

In some implementations, the logical entity of the first MLD updates the common scoreboard by indicating, in the common scoreboard, that an MPDU of the one or more MPDUs of the first set assigned to the first STA or an MPDU of the one or more MPDUS of the second set assigned to the second STA has failed in response to receiving a BA status report from the STA to which the MPDU is assigned indicating a failed state for the MPDU.

Another innovative aspect of the subject matter described in this disclosure can be implemented in an apparatus for wireless communications by a first MLD that includes a first STA and a second STA. The apparatus includes at least one processor, and at least one memory communicatively coupled with the at least one processor and storing processor-readable code that, when executed by the at least one processor, is configured to: transmit, by the first STA of the first MLD to a third STA of a second MLD via a first wireless link between the first STA and the third STA, one or more first MPDUs assigned to the first STA; transmit, by the second STA of the first MLD to a fourth STA of the second MLD via a second wireless link between the second STA and the fourth STA, one or more second MPDUs assigned to the second STA; receive, by the first STA of the first MLD from the third STA of the second MLD via the first wireless link, a BA including a first set of one or more bits providing acknowledgment feedback for the one or more first MPDUs assigned to the first STA and a second set of one or more bits providing acknowledgment feedback for the one or more second MPDUs assigned to the second STA; determine a state of each of the one or more first MPDUs assigned to the first STA of the first MLD based on the first set of bits; determine a state of each of the one or more second MPDUs assigned to the second STA of the first MLD based on the second set of bits; generate a BA status report based on the determined states of the one or more first MPDUs assigned to the first STA and the determined states of the one or more second MPDUs assigned to the second STA; and provide the BA status report to a logical entity of the first MLD.

Another innovative aspect of the subject matter described in this disclosure can be implemented in an apparatus for wireless communications by a logical entity of a first MLD. The apparatus includes at least one processor, and at least one memory communicatively coupled with the at least one processor and storing processor-readable code that, when executed by the at least one processor, is configured to: assign a first set of one or more Medium Access Control (MAC) Protocol Data Unit (MPDUs) to a first station (STA) of the first MLD for transmission on a first wireless link between the first STA and a third STA of a second MLD; assign a second set of one or more MPDUs to a second STA of the first MLD for transmission on a second wireless link between the second STA and a fourth STA of the second MLD; receive one or more block acknowledgment (BA) status reports from at least one of the first STA or the second STA indicating a state of each MPDU in the first set of one or more MPDUs assigned to the first STA and a state of each MPDU in the second set of one or more MPDUs assigned to the second STA, wherein the state of each MPDU is indicated as a state value selected from one of at least four state values; and update a common scoreboard used to track the states of the one or more MPDUs in the first set transmitted across the first wireless link and the one or more MPDUs in the second set transmitted across the second wireless link, based on the one or more BA status reports.

Another innovative aspect of the subject matter described in this disclosure can be implemented in an apparatus for wireless communication by a first MLD that includes a first STA and a second STA. The apparatus includes means for transmitting, by the first STA of the first MLD to a third STA of a second MLD via a first wireless link between the first STA and the third STA, one or more first MPDUs assigned to the first STA; means for transmitting, by the second STA of the first MLD to a fourth STA of the second MLD via a second wireless link between the second STA and the fourth STA, one or more second MPDUs assigned to the second STA; means for receiving, by the first STA of the first MLD from the third STA of the second MLD via the first wireless link, a BA including a first set of one or more bits providing acknowledgment feedback for the one or more first MPDUs assigned to the first STA and a second set of one or more bits providing acknowledgment feedback for the one or more second MPDUs assigned to the second STA; means for determining a state of each of the one or more first MPDUs assigned to the first STA of the first MLD based on the first set of bits; means for determining a state of each of the one or more second MPDUs assigned to the second STA of the first MLD based on the second set of bits; means for generating a BA status report based on the determined states of the one or more first MPDUs assigned to the first STA and the determined states of the one or more second MPDUs assigned to the second STA; and means for providing the BA status report to a logical entity of the first MLD.

Another innovative aspect of the subject matter described in this disclosure can be implemented in an apparatus for wireless communication by a logical entity of a first MLD. The apparatus includes means for assigning a first set of one or more MPDUs to a first STA of the first MLD for transmission on a first wireless link between the first STA and a third STA of a second MLD; means for assigning a second set of one or more MPDUs to a second STA of the first MLD for transmission on a second wireless link between the second STA and a fourth STA of the second MLD; means for receiving one or more BA status reports from at least one of the first STA or the second STA indicating a state of each MPDU in the first set of one or more MPDUs assigned to the first STA and a state of each MPDU in the second set of one or more MPDUs assigned to the second STA, wherein the state of each MPDU is indicated as a state value selected from one of at least four state values; and means for updating a common scoreboard used to track the states of the one or more MPDUs in the first set transmitted across the first wireless link and the one or more MPDUs in the second set transmitted across the second wireless link, based on the one or more BA status reports.

Another innovative aspect of the subject matter described in this disclosure can be implemented in a computer-readable medium having instructions stored thereon to cause an apparatus to transmit, by a first STA of a first MLD to a third STA of a second MLD via a first wireless link between the first STA and the third STA, one or more first MPDUs assigned to the first STA; transmit, by the second STA of the first MLD to a fourth STA of the second MLD via a second wireless link between the second STA and the fourth STA, one or more second MPDUs assigned to the second STA; receive, by the first STA of the first MLD from the third STA of the second MLD via the first wireless link, a BA including a first set of one or more bits providing acknowledgment feedback for the one or more first MPDUs assigned to the first STA and a second set of one or more bits providing acknowledgment feedback for the one or more second MPDUs assigned to the second STA; determine a state of each of the one or more first MPDUs assigned to the first STA of the first MLD based on the first set of bits; determine a state of each of the one or more second MPDUs assigned to the second STA of the first MLD based on the second set of bits; generate a BA status report based on the determined states of the one or more first MPDUs assigned to the first STA and the determined states of the one or more second MPDUs assigned to the second STA; and provide the BA status report to a logical entity of the first MLD.

Another innovative aspect of the subject matter described in this disclosure can be implemented in a computer-readable medium having instructions stored thereon to cause an apparatus to assign a first set of one or more MPDUs to a first STA of a first MLD for transmission on a first wireless link between the first STA and a third STA of a second MLD; assign a second set of one or more MPDUs to a second STA of the first MLD for transmission on a second wireless link between the second STA and a fourth STA of the second MLD; receive one or more BA status reports from at least one of the first STA or the second STA indicating a state of each MPDU in the first set of one or more MPDUs assigned to the first STA and a state of each MPDU in the second set of one or more MPDUs assigned to the second STA, wherein the state of each MPDU is indicated as a state value selected from one of at least four state values; and update a common scoreboard used to track the states of the one or more MPDUs in the first set transmitted across the first wireless link and the one or more MPDUs in the second set transmitted across the second wireless link, based on the one or more BA status reports.

Other innovative aspects of the subject matter described in this disclosure can be implemented in various apparatus, means, and computer program products corresponding to the methods and operations described above.

BRIEF DESCRIPTION OF THE DRAWINGS

Details of one or more implementations of the subject matter described in this disclosure are set forth in the accompanying drawings and the description below. However, the accompanying drawings illustrate only some aspects of this disclosure. Other features, aspects, and advantages will become apparent from the description, the drawings and the claims.

FIG. 6A summarizes example types of coordination between MLD access points (APs).

FIG. 6B shows an example BA for transmissions between MLDs.

FIGS. 15A and 15B show example request and response frame formats for setting up status reports according to some implementations.

Like reference numbers and designations in the various drawings indicate like elements.

DETAILED DESCRIPTION

Figure 1:
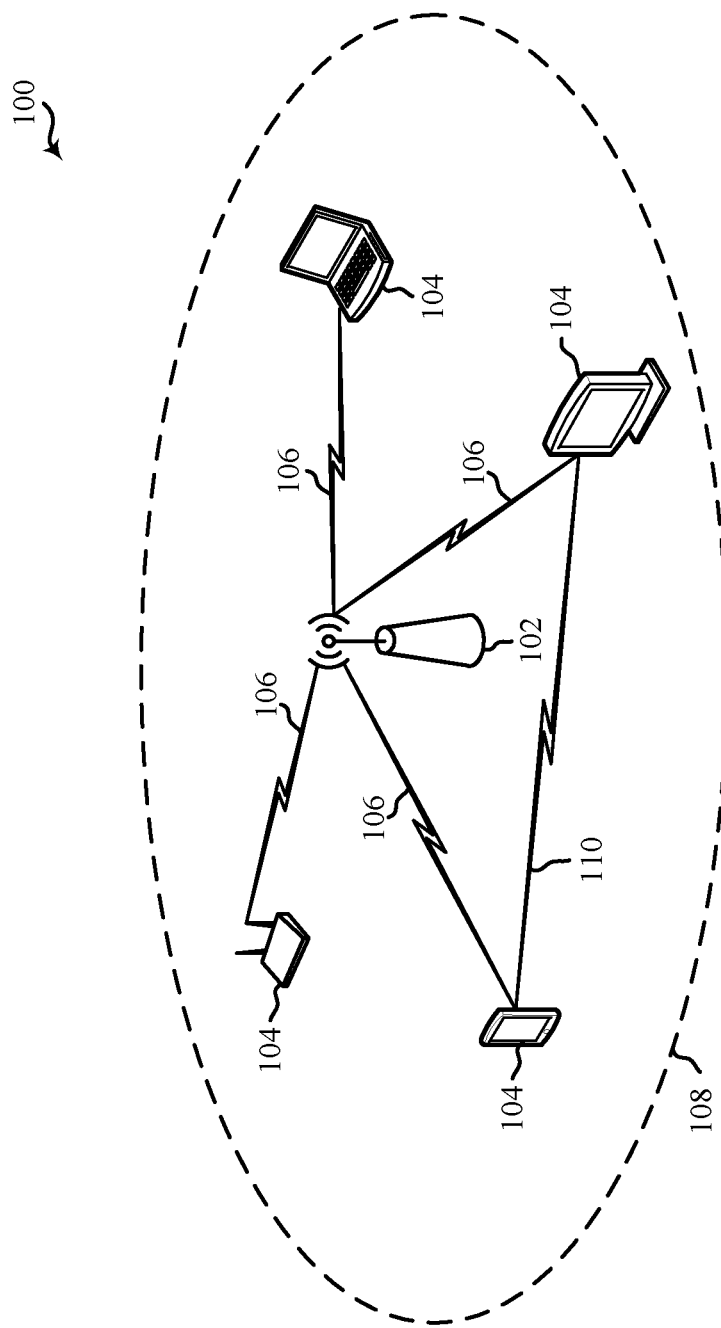
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

As initially described above, certain wireless networks, such as 802.11be networks, allow multi-link devices (MLDs) to utilize a feature called multi-link aggregation (MLA), whereby medium access control (MAC) protocol data units (MPDUs) from a same traffic ID (TID) can be sent in two or more links. In some MLD implementations, however, the speed of communication between the hardware of the different entities within an MLD, such as access point (AP) stations (STAs) (STAs serving as Aps or simply "Aps") and/or non-AP STAs (or simply (STAs"), may be limited and/or Aps may not be co-located. In such an implementation, a (non-AP or AP) STA of an MLD may not have knowledge of the most recently transmitted or received MPDUs by another STA of the MLD (on another wireless link). This may limit the accuracy of block acknowledgment (BA) feedback and/or the speed at which such information may be updated.

Various implementations relate generally to MLDs, such as those deployed in 802.11be networks (also referred to as Extremely High Throughput (EHT) networks) that utilize MLA. The described techniques efficiently and reliably acknowledge, via BAs, MPDUs sent on different wireless links between a first MLD (for example, an AP that includes two or more STA instances or entities) and a second MLD (for example, a user or client device associated with the AP that may include two or more STA entities). The techniques described herein may enable a first STA of an MLD to determine, based on the BAs, state values for MPDUs transmitted by the first STA on the first wireless link, as well as state values for MPDUs transmitted by a second STA of the MLD on the second wireless link. In some examples, each of the first STA and the second STA of the MLD may provide status reports to a higher level logical entity based on the BA information for MPDUs sent on both links obtained over the air (OTA).

Particular implementations of the subject matter described in this disclosure may be implemented to realize one or more of the following potential advantages. In some implementations, the described techniques may be used to efficiently acknowledge, via BAs, MPDUs sent on first and second wireless links. In some examples, the status reports, described herein, may enable faster and more accurate updating of information by higher layers and more efficient scheduling (for example, assignment/re-assignment) of MPDUs to the first and second STAs for subsequent transmission to the user STA.

FIG. 1 shows a block diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The wireless communication network 100 may include numerous wireless communication devices such as an AP 102 and multiple user STAs 104. While only one AP 102 is shown, the wireless communication network 100 also can include multiple APs 102.

Each of the user STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the wireless communication network 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the wireless communication network 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the wireless communication network 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the physical (PHY) and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
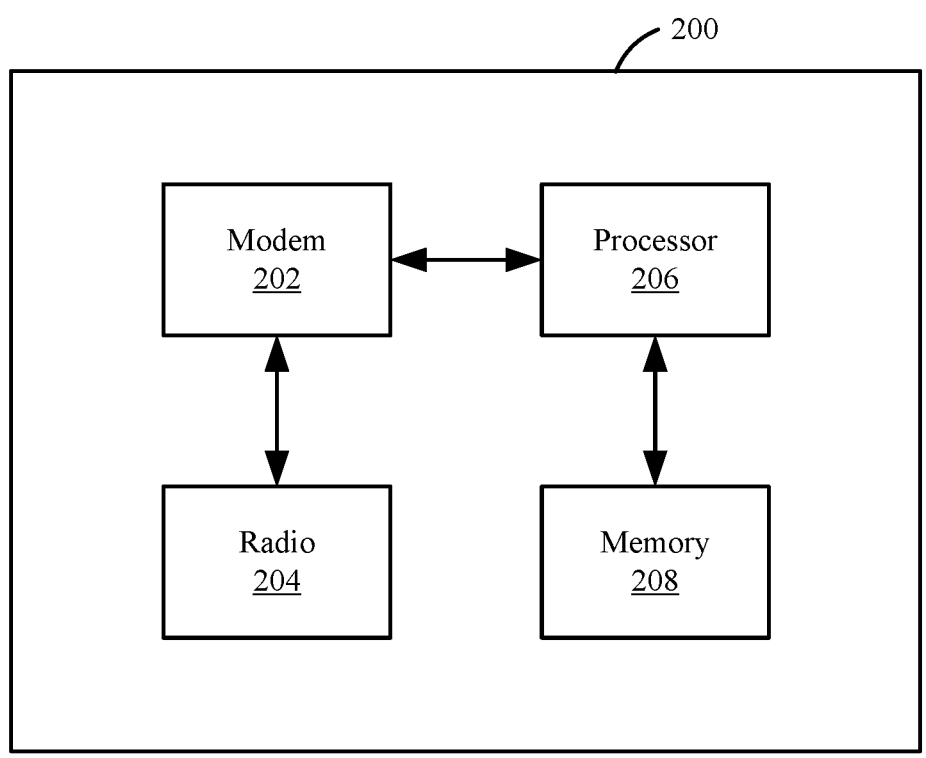
FIG. 2 shows a block diagram of an example wireless communication device.

FIG. 2 shows a block diagram of an example wireless communication device 200. In some implementations, the wireless communication device 200 can be an example of a device for use in a STA such as one of the STAs 104 described above with reference to FIG. 1. In some implementations, the wireless communication device 200 can be an example of a device for use in an AP such as the AP 102 described above with reference to FIG. 1. The wireless communication device 200 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 200 can be, or can include, a chip, system on chip (SoC), chipset, package or device that includes one or more modems 202, for example, a Wi-Fi (IEEE 802.11 compliant) modem. In some implementations, the one or more modems 202 (collectively "the modem 202") additionally include a WWAN modem (for example, a 3GPP 4G LTE or 5G compliant modem). In some implementations, the wireless communication device 200 also includes one or more radios 204 (collectively "the radio 204"). In some implementations, the wireless communication device 206 further includes one or more processors, processing blocks or processing elements 206 (collectively "the processor 206") and one or more memory blocks or elements 208 (collectively "the memory 208").

The modem 202 can include an intelligent hardware block or device such as, for example, an application-specific integrated circuit (ASIC) among other possibilities. The modem 202 is generally configured to implement a PHY layer. For example, the modem 202 is configured to modulate packets and to output the modulated packets to the radio 204 for transmission over the wireless medium. The modem 202 is similarly configured to obtain modulated packets received by the radio 204 and to demodulate the packets to provide demodulated packets. In addition to a modulator and a demodulator, the modem 202 may further include digital signal processing (DSP) circuitry, automatic gain control (AGC), a coder, a decoder, a multiplexer and a demultiplexer. For example, while in a transmission mode, data obtained from the processor 206 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 204. In implementations involving beamforming, the modulated symbols in the respective spatial streams are precoded via a steering matrix prior to their provision to the IFFT block.

While in a reception mode, digital signals received from the radio 204 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 206) for processing, evaluation or interpretation.

The radio 204 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 202 are provided to the radio 204, which then transmits the symbols via the coupled antennas. Similarly, symbols received via the antennas are obtained by the radio 204, which then provides the symbols to the modem 202.

The processor 206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 206 processes information received through the radio 204 and the modem 202, and processes information to be output through the modem 202 and the radio 204 for transmission through the wireless medium. For example, the processor 206 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 206 may generally control the modem 202 to cause the modem to perform various operations described above.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 206, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 3B:
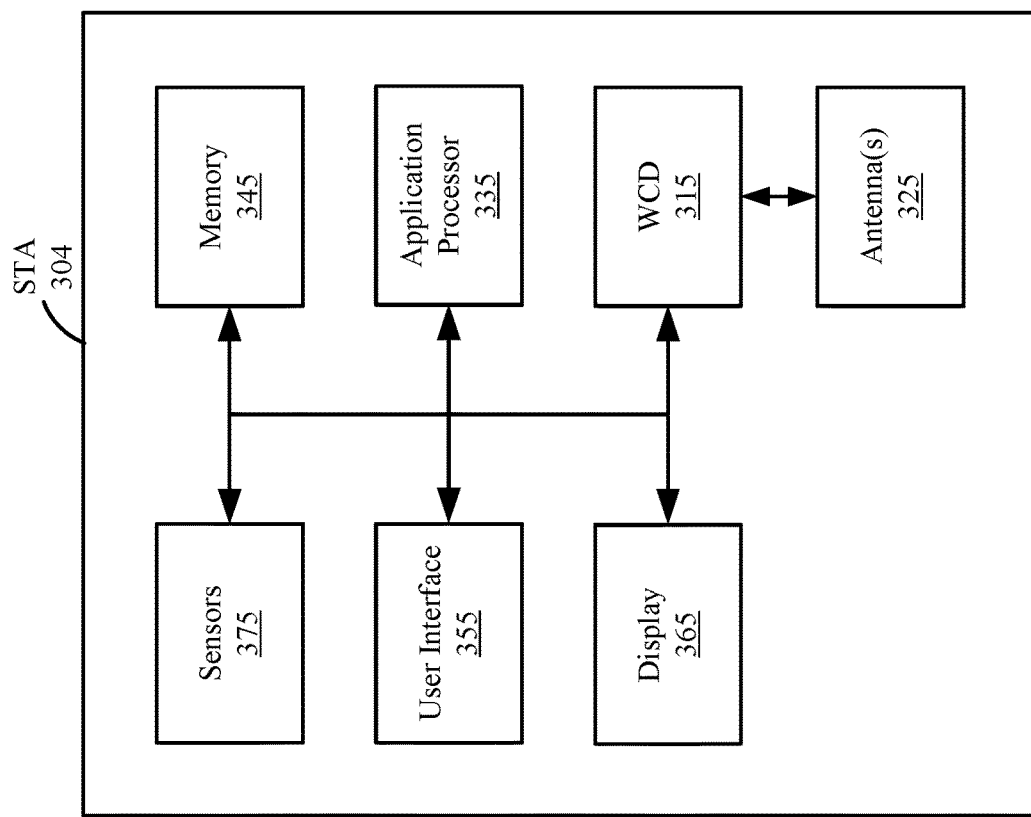
FIG. 3B shows a block diagram of an example station (STA).
Figure 3A:
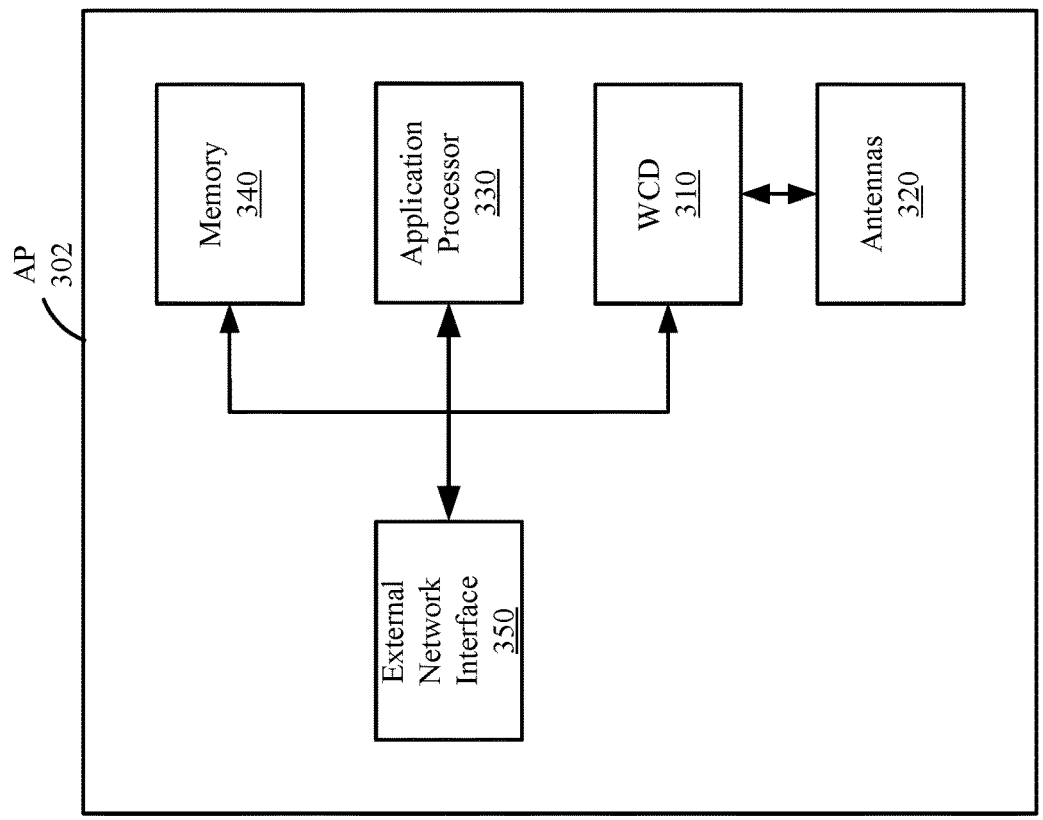
FIG. 3A shows a block diagram of an example access point (AP).

FIG. 3A shows a block diagram of an example AP 302. For example, the AP 302 can be an example implementation of the AP 102 described with reference to FIG. 1. The AP 302 includes a wireless communication device (WCD) 310 (although the AP 302 may itself also be referred to generally as a wireless communication device as used herein). For example, the wireless communication device 310 may be an example implementation of the wireless communication device 200 described with reference to FIG. 2. The AP 302 also includes multiple antennas 320 coupled with the wireless communication device 310 to transmit and receive wireless communications. In some implementations, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface).

Ones of the aforementioned components can communicate with other ones of the components directly or indirectly, over at least one bus. The AP 302 further includes a housing that encompasses the wireless communication device 310, the application processor 330, the memory 340, and at least portions of the antennas 320 and external network interface 350.

FIG. 3B shows a block diagram of an example STA 304. For example, the STA 304 can be an example implementation of the STA 104 described with reference to FIG. 1. The STA 304 includes a wireless communication device 315 (although the STA 304 may itself also be referred to generally as a wireless communication device as used herein). For example, the wireless communication device 315 may be an example implementation of the wireless communication device 300 described with reference to FIG. 3. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some implementations, the STA 304 further includes a user interface (UI) 355 (such as a touchscreen or keypad) and a display 365, which may be integrated with the UI 355 to form a touchscreen display. In some implementations, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365.

Example Multi-Link Block Acknowledgement (BA) Procedure

As initially described above, a multi-link device (MILD) generally refers to a single device or equipment that includes two or more station (STA) instances or entities, implemented in a physical (PHY)/medium access control (MAC) layer and configured to communicate on separate wireless links. In some examples, each MLD may include a single higher layer entity, such as a MAC Service Access Point (SAP) that may assign MAC protocol data units (MPDUs) for transmission by the separate STA instances.

Figure 4:
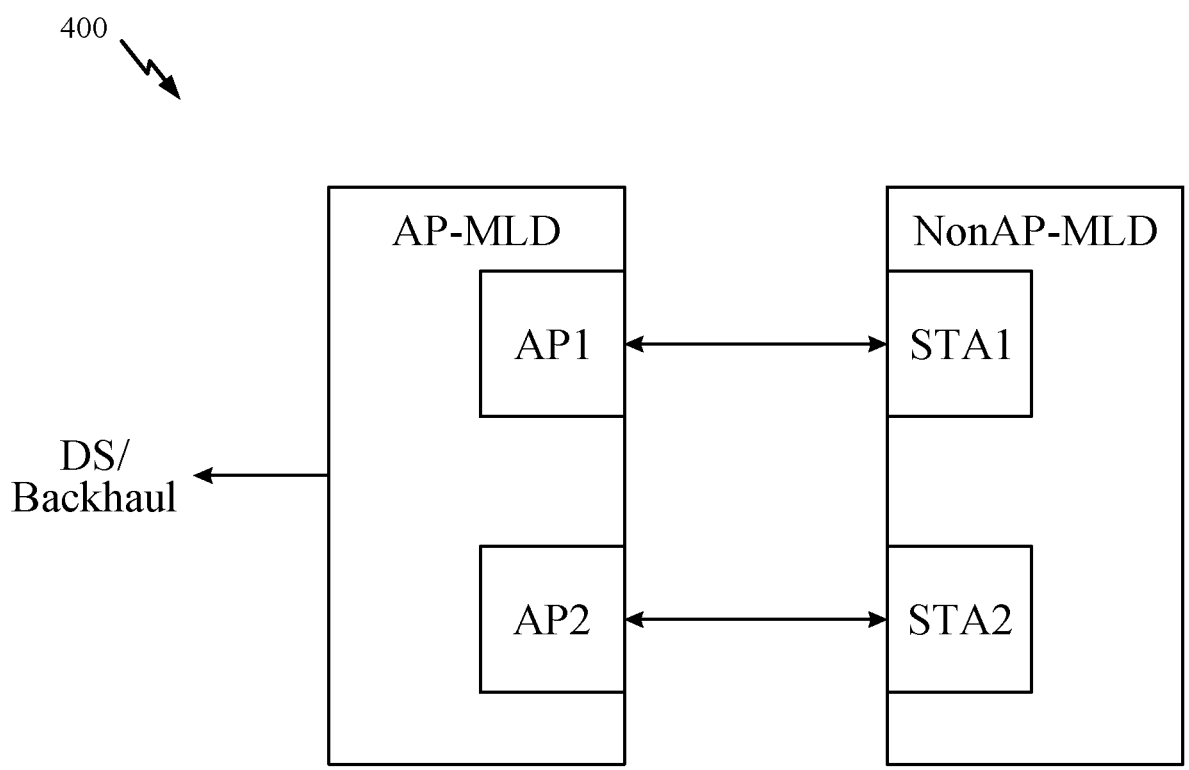
FIG. 4 shows a block diagram of an example multi-link device (MLD) deployment.

FIG. 4 shows a block diagram of an example MLD deployment. As shown in FIG. 4, an access point (AP) MLD may communicate with a non-AP MLD. As described above, each of the AP MLD and the non-AP MLD may include at least two STA entities (hereinafter also referred to simply as "STAs") that may communicate with associated STAs of another MLD. In an AP MLD, the STAs may be AP STAs (STAs serving as APs or simply "APs"). In a non-AP MLD, the STAs may be non-AP STAs (STAs not serving as APs). As also described above, MLDs may utilize multi-link aggregation (MLA) (which includes packet level aggregation), whereby MPDUs from a same traffic ID (TID) may be sent via two or more links.

Multi-link operation (MLO) is generally regarded as one of the key features in the upcoming 802.11be standard. It is desirable that the MLO framework account for MLDs with a variety of capabilities, including, for example, MLDs with loose coordination between STA instances. This may be the case, for example, when (for example, for performance and modular efficiency) multiple STAs of the MLD are implemented using separate hardware (for example, different chips or chipsets) and the speed of communication between the hardware of the different STAs within the MLD is limited. In other words, AP STAs in the lower MAC layer devices (the STA instances) may not have a fast communication link between them. In some configurations, the interface between the two links may be slower than, for example, 16 µs. However, this may not be the case on the non-AP MLD side, in which the hardware for both STA instances of the non-AP MLD is implemented via a same chip/chipset. In contrast, an AP MLD may include STA instances implemented on different chips. In such examples, it may be assumed that no serial links exist between the different chips, such that there is no fast information sharing, which results in increased latency (for example, on the order of approximately 1-10 ms) between two STA instances of the AP MLD.

Conventionally, in a single link case, an originator (or transmitter) device solicits the receive (RX) status for MPDUs that it has transmitted. A bit value of "1" in the received block acknowledgement (BA) bitmap indicates a successfully received MPDU (a positive acknowledgment or ACK), while a bit value of "0" indicates an MPDU was not successfully received (a negative acknowledgment or NACK), for example, because the MPDU was lost or not decoded correctly.

For MLO, however, gathering accurate cross-link RX-status of MPDUs presents a challenge because a given transmitter (for example, a first STA of the MILD) knows only which MPDUs it has transmitted. The transmitter does not know which MPDUs a second transmitter (for example, a second STA of the MLD) has transmitted. In MLO, MPDUs are allocated from a common queue to each STA of the MLD for transmission. A STA of an MLD may not have knowledge of the MPDUs allocated to another STA for transmission. Further, on the RX-side, a STA may not have knowledge of the most recently received MPDUs by another STA of the MLD. Additionally, there may be a lag in updating the MPDU RX status information across receiving STAs of a MLD.

Therefore, as will be described in greater detail below with reference to FIGS. 5-8, a STA instance may provide accurate receive status information for MPDUs received on its link. If and when available, a STA may also provide accurate information about successful reception (BA bit "1") of MPDUs received by another STA of its MLD. However, an originator (TX) STA receiving a value "0" in the BA bitmap for an MPDU that it has not transmitted has no meaning (unknown). A bit value of "0" has no meaning because the STA may not be able to determine if an MPDU was never allocated, has yet to be transmitted, is in-transit, or is indeed lost. Therefore, using a conventional BA procedure for MLO may not enable the STA to accurately report failure of an MPDU on behalf of another STA.

Particular implementations of the subject matter described in this disclosure may be used to efficiently acknowledge, via BAs, MPDUs sent on first and second wireless links. In some examples, the status reports described herein may enable faster and more accurate updating of information by higher layers and more efficient scheduling (for example, assignment/re-assignment) of MPDUs to the first and second STAs for subsequent transmission to the user STA.

Figure 5:
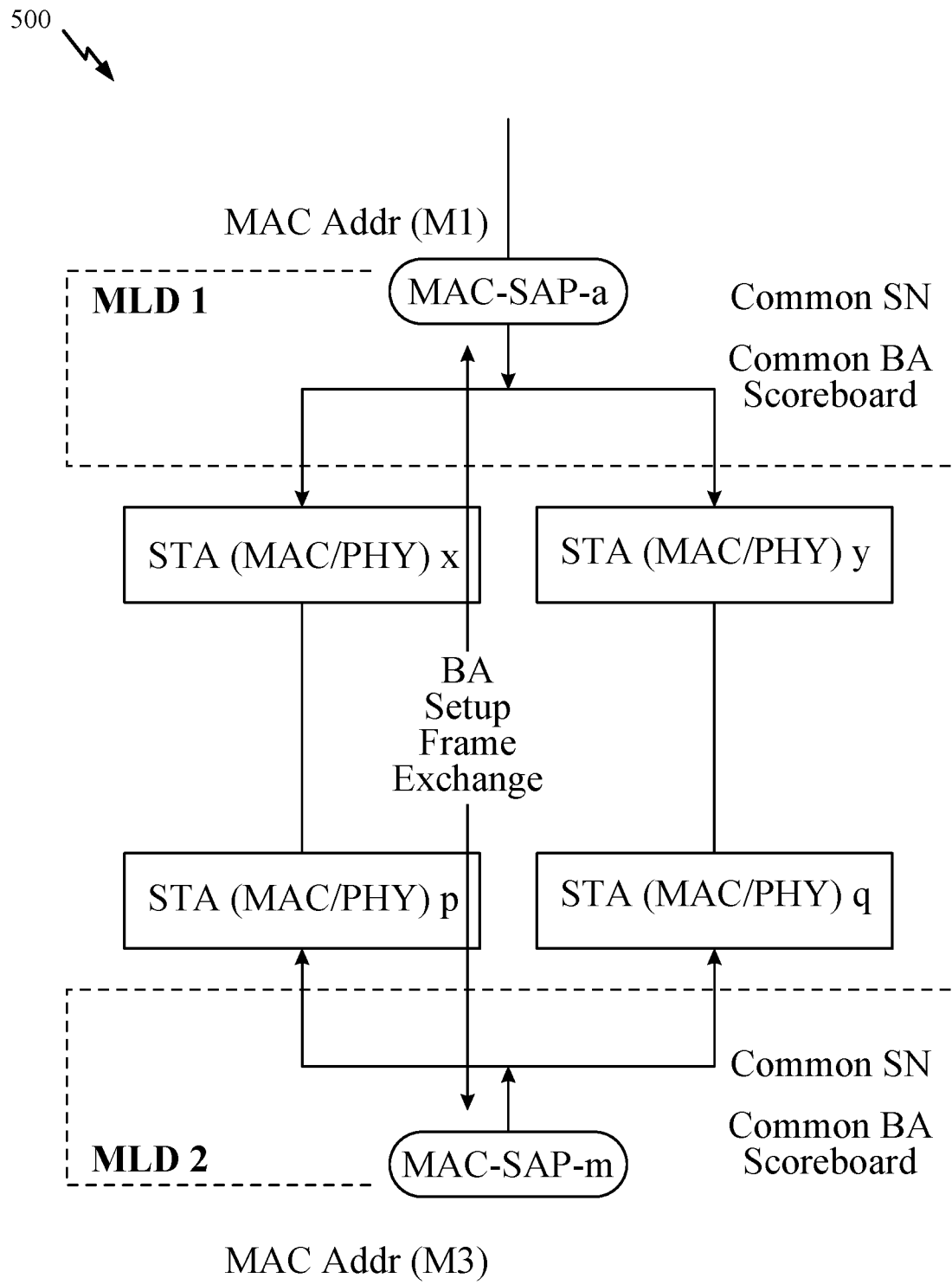
FIG. 5 shows an example block acknowledgment (BA) setup frame exchange between MLDs.

FIG. 5 shows an example BA setup frame exchange between MLDs. As will be described in greater detail below, the setup frame exchange may be considered a negotiation in which frames are exchanged over one of the common links to establish a common BA session for a traffic ID (TID). For example, one MLD (such as, MLD1) may send a request frame indicating one or more links to which the TID should be mapped, and the other MLD (such as, MLD2) may send a response frame indicating the same links (i.e., accepting the request) or different links.

As shown in FIG. 5, a logical entity, referred to as a MAC service access point (SAP), may serve as an interface between STA instances in a lower MAC/PHY layer. The MAC SAP may assign MPDUs to the different STA instances (for example, STA x and STA y as shown in FIG. 5). The MAC SAP may track the status of MPDUs (transmitted on the different links) using a structure referred to as a scoreboard. The scoreboard may track the status of each MPDU (each MPDU may be assigned a different sequence number (SN)) per TID across the multiple links.

The MAC SAP may update the scoreboard based on information received over the air (OTA) from the individual STA instances. In some cases, one STA may receive acknowledgment (or ACK) feedback over the air for MPDUs transmitted by the other STA. Unfortunately, this information may be of limited use.

FIG. 6A summarizes example types of coordination between MLD APs. As shown in FIG. 6A, in the case of loose coordination between STAs of the AP MLD (such as, MLD1), a STA instance may have limited or no status of the other STA instance. In other words, STA x (previously illustrated in FIG. 5) may have limited or no status of the MPDUs assigned to (and/or transmitted by) STA y.

FIG. 6B shows an example BA for transmissions between MLDs. As shown in the example of FIG. 6B, a MAC SAP may assign MPDUs with SNs 1-6 to STA y and MPDUs with SNs 7-9 to STA x. In the example, STA y may receive a BA that includes acknowledgment (or ACK) information bits for (MPDUs with) SNs 7-9. Unfortunately, at the time of the ACK, the receiving STA (such as, STA q) may not have knowledge of the most recent MPDUs received at the other STA (such as, STA p); therefore, the acknowledgment feedback for SNs 7-9 may not be current.

As a result, while a positive acknowledgment (indicated by a bit with a value "1" in the BA) for an SN assigned to the other STA may be considered valid, a negative acknowledgment (indicated by a bit with a value "0" in the BA) may be ambiguous. In other words, if STA y does not have knowledge of what STA x has transmitted/re-transmitted, the bit value of "0" in the BA received by STA y may indicate an actual failure or that the corresponding MPDU is pending (for example, has yet to be transmitted or STA x is retransmitting that MPDU).

Figure 7:
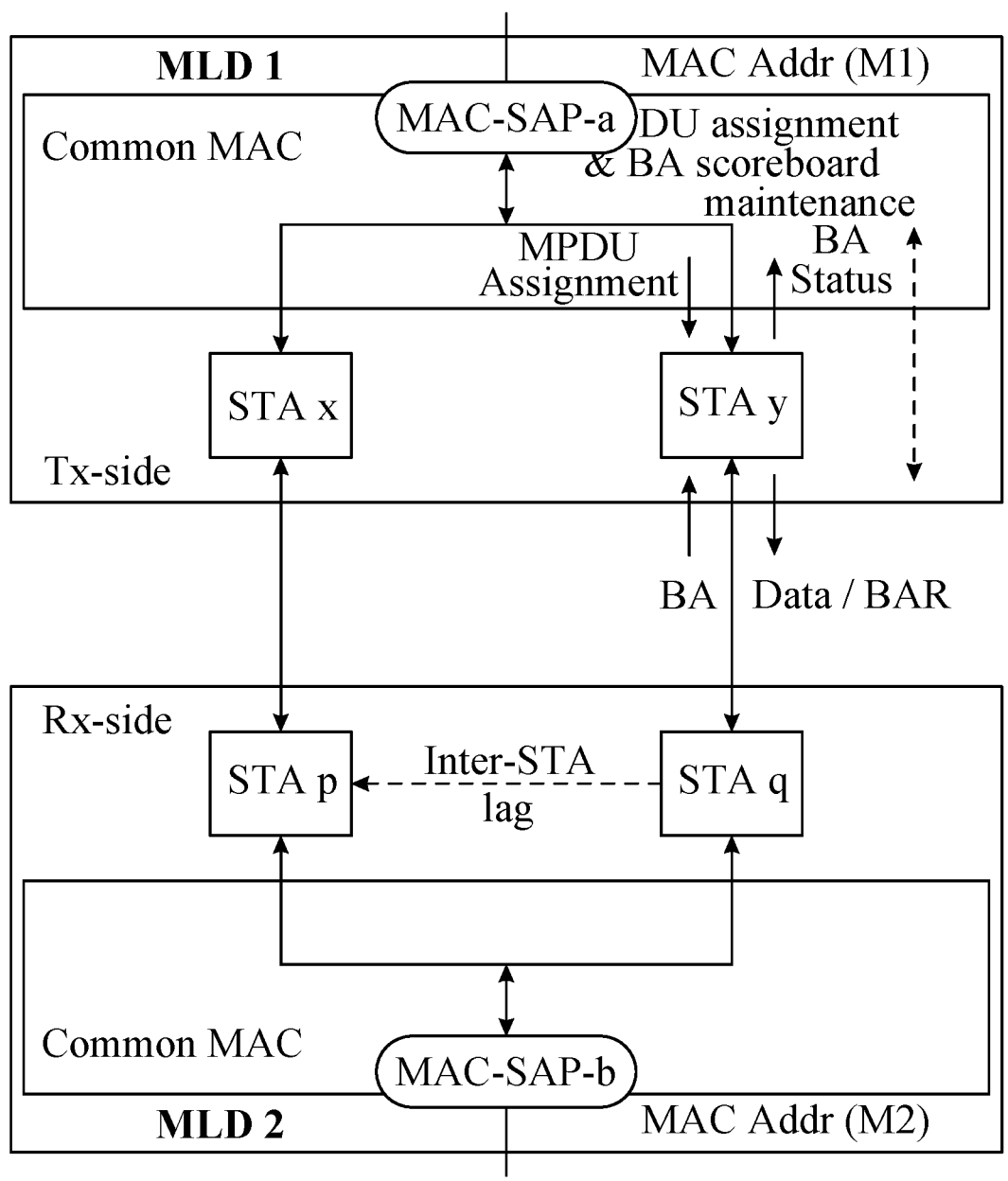
FIG. 7 shows an example of maintaining a BA scoreboard for transmissions between MLDs.

Further, due to a lag in updating the receive status, shown in the timing diagram of FIG. 6 (and also indicated as an Inter-STA lag (between STA p and STA q) in FIG. 7), an MPDU may have been successfully received by STA p by the time of the ACK, but not in time to update the corresponding bit in the BA.

As a result, the information received by the MAC SAP in a BA status from STA y may not be current. Thus, information reflected in the BA scoreboard maintained by the MAC SAP may also not be current (i.e., MAC SAP updates the scoreboard with non-current information received from STA y), and performance may be negatively impacted. For example, this may hinder how fast the MAC-SAP is able to advance the transmission window and/or retransmit (or re-assign) failed MPDUs.

Figure 8:
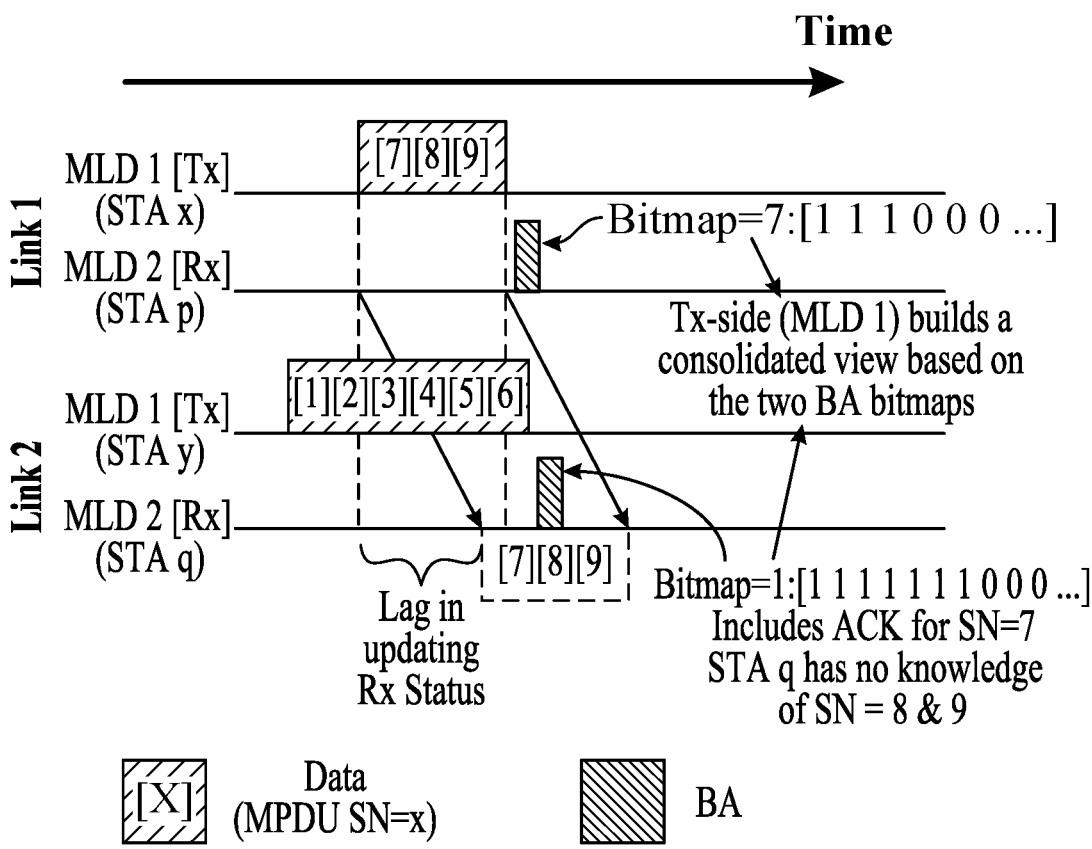
FIG. 8 shows an example of BAs sent on different links for transmissions between MLDs.

FIG. 8 shows an example of BAs sent on different links for transmissions between MLDs. As shown in FIG. 8, the inter-STA lag effects both STAs, as the BA bitmaps reported by STA p and STA q both include bits for SNs assigned to STA x (7-9) and STA y (1-6). For example, in the case SN 7 has been successfully received in time for STA p to update the receive status communicated of STA q, STA q may include this positive acknowledgment (ACK with bit value "1") in its BA. However, with no knowledge of the receive status of SNs 8 and 9, even if these SNs were successfully received by STA p, STA q may indicate a negative acknowledgment (NACK with bit value "0") in its BA for these SNs.

As shown in FIG. 8, at the transmit (TX) side (MLD 1), the MAC SAP layer may update the MPDU scoreboard, based on a consolidated view of the information received from the BAs reported by STA p and STA q. Unfortunately, because the (inter-STA) information received in each BA may not be current, the information in the BA scoreboard maintained by the MAC SAP may also not be current. This may impact MPDU assignment and effect overall performance, for example, limiting how fast the MAC-SAP may be able to re-assign failed MPDUs from one STA to the other (or advance a timing window to move on to transmit other queued MPDUs).

Certain implementations of the subject matter described herein, however, may help improve performance, by providing an MLO BA framework used to help provide more current and accurate information and account for MLDs with a variety of capabilities. For example, the MLO BA framework described herein, may help provide more accurate information in MLD scenarios where tight coordination between STA instances does not exist (for example, scenarios where STAs may not have knowledge of the most recently received MPDUs by another STA of the MLD). In some cases, the MLO BA framework described herein, may use existing BA and BA frame formats for OTA reporting between MLDs, while originating STAs may additionally process BAs received OTA to generate more useful BA status reports for MPDUs sent by other STAs.

Figure 9:
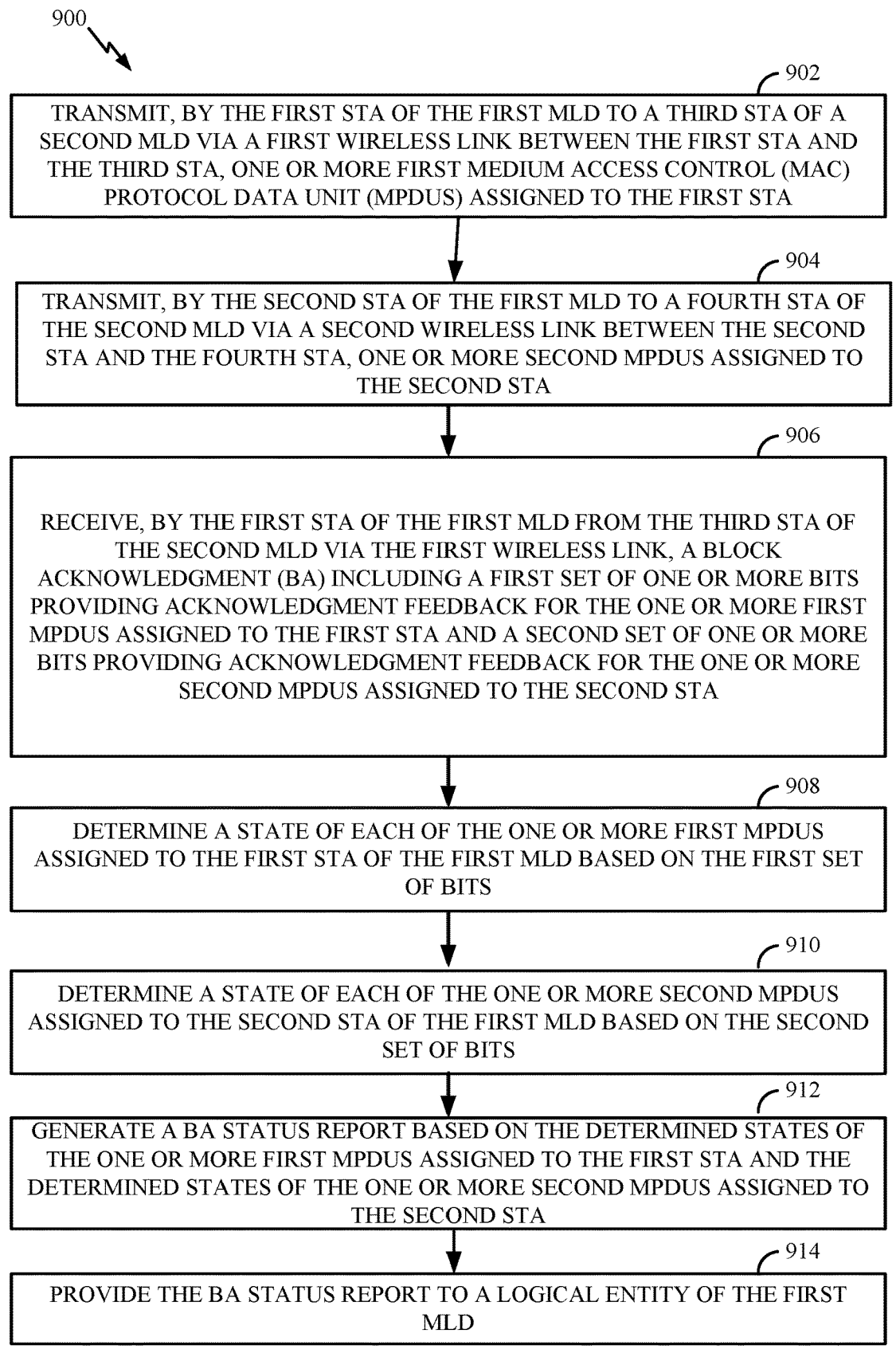
FIG. 9 shows a flowchart illustrating an example BA process for an MLD STA according to some implementations.

FIG. 9 shows a flowchart illustrating an example BA process 900 for a first MLD that includes a first STA and a second STA according to some implementations. The operations of process 900 may be implemented by a wireless communication device or its components as described herein. For example, the process 900 may be performed by a wireless communication device such as the wireless communication device 200 described above with reference to FIG. 2. In some implementations, the process 900 may be performed by an STA, such as STA x or STA y described below with reference to FIG. 12 or 14. In fact, -operations 900 of FIG. 9 may be understood with reference to diagrams 1200 and 1400 of FIGS. 12 and 14.

In some implementations, in block 902, a first MLD that includes a first STA and a second STA transmits, by the first STA of the first MLD to a third STA of a second MLD via a first wireless link between the first STA and the third STA, one or more first MPDUs assigned to the first STA. For example, STA x of MLD 1 (for example, the first STA affiliated with the first MLD), shown in FIG. 12, may be assigned and transmit MPDUs with SNs 1-5. The first wireless link may be considered affiliated with the first MLD. In this context, the affiliation generally indicates that a particular STA (or an AP) may be bound to an MLD and that MLD provides common functionality (such as a BA scoreboard) to all such STAs bound to it.

In block 904, the first MLD transmits, by the second STA of the first MLD to a fourth STA of the second MLD via a second wireless link between the second STA and the fourth STA, one or more second MPDUs assigned to the second STA.

Figure 12:
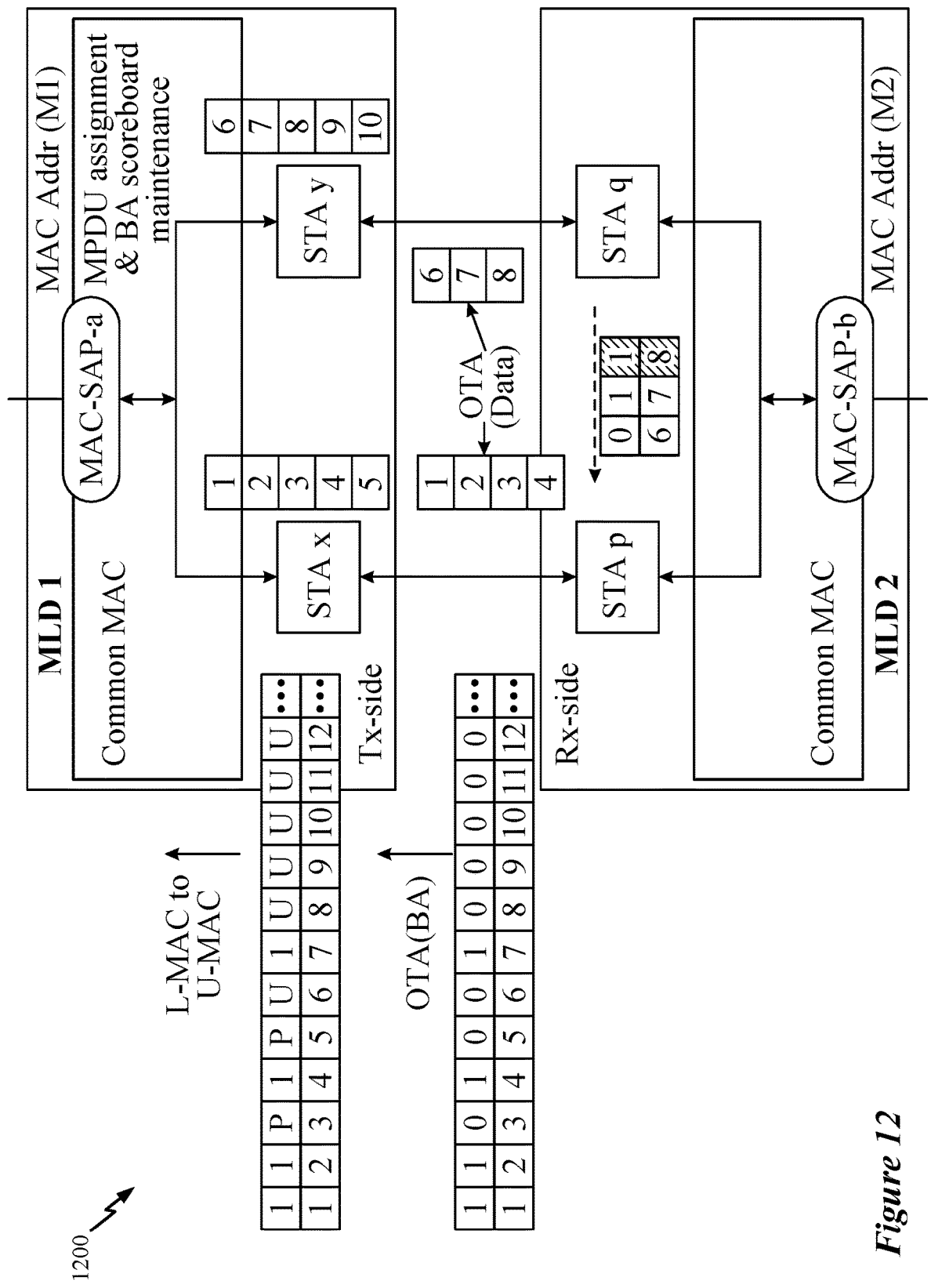
FIG. 12 shows an example of BA status reports according to some implementations.

In block 906, the first MLD receives, by the first STA of the first MLD from the third STA of the second MLD via the first wireless link, a BA including a first set of one or more bits providing acknowledgment feedback for the one or more first MPDUs assigned to the first STA and a second set of one or more bits providing acknowledgment feedback for the one or more second MPDUs assigned to the second STA. For example, as illustrated in FIG. 12, STA x (for example, the first STA affiliated with the first MLD) may receive a BA from STA p of MLD 2 that includes BA information for MPDUs 1-5 transmitted by STA x as well as BA information for MPDUs 6-10 assigned to STA y.

In block 908, the first MLD determines a state of each of the one or more first MPDUs assigned to the first STA of the first MLD based on the first set of bits. In block 910, the first MLD determines a state of each of the one or more second MPDUs assigned to the second STA of the first MLD based on the second set of bits.

In block 912, the first MLD generates a BA status report based on the determined states of the one or more first MPDUs assigned to the first STA and the determined states of the one or more second MPDUs assigned to the second STA.

In block 914, the first STA of the first MLD provides the BA status report to a logical entity of the first MLD. As illustrated in FIG. 12, STA x (for example, the first STA affiliated with the first MLD) may take the binary status information from the OTA BA to generate more detailed status, including Pending "P" and/or unknown "U" statuses to be reported to the upper layer (for example, to be reported to the MAC SAP).

Figure 10:
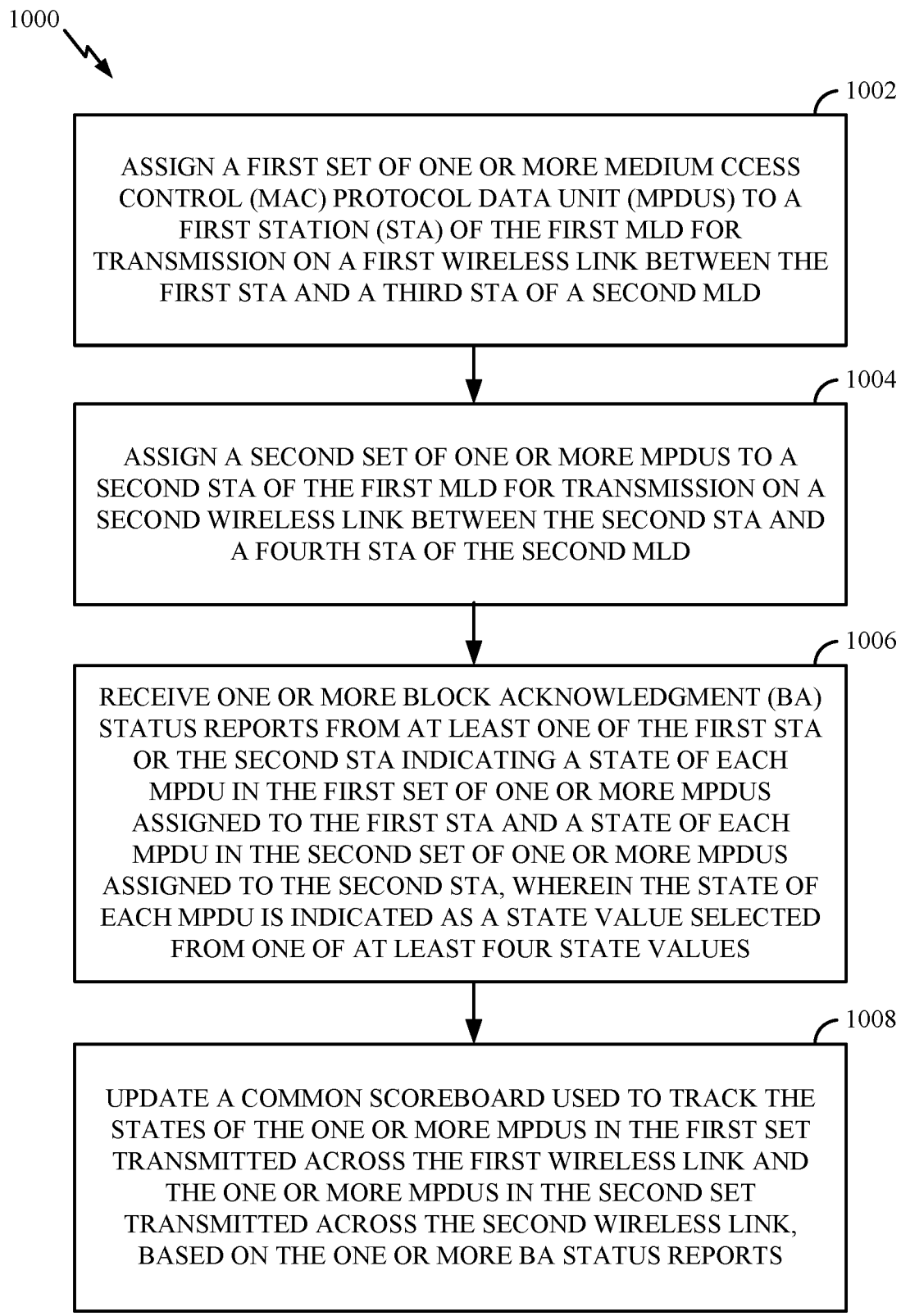
FIG. 10 shows a flowchart illustrating an example BA process for a logical entity of an MLD according to some implementations.

FIG. 10 shows a flowchart illustrating an example BA process 1000 for a logical entity (such as, a MAC SAP) of a first MLD according to some implementations. The operations of process 1000 may be considered complementary to the operations of process 900 in FIG. 9. For example, the operations of process 1000 may be performed by a MAC SAP to process BA status reports received from a STA performing operations of process 900 described above.

The operations of process 1000 may be implemented by a wireless communication device or its components as described herein. For example, the process 1000 may be performed by a wireless communication device such as the wireless communication device 200 described above with reference to FIG. 2. In some implementations, the process 1000 may be performed by a logical entity, such as the MAC SAP of MLD 1 or MLD 2 described below with reference to FIG. 12 or 14. In fact, operations 1000 of FIG. 10 may be understood with reference to diagrams 1200 and 1400 of FIGS. 12 and 14.

In some implementations, in block 1002, a logical entity of a first MLD assigns a first set of one or more MPDUs to a first STA of the first MLD for transmission on a first wireless link between the first STA and a third STA of a second MLD. In block 1004, the logical entity of the first MLD assigns a second set of one or more MPDUs to a second STA of the first MLD for transmission on a second wireless link between the second STA and a fourth STA of the second MLD. As shown in FIG. 12, the MAC SAP (for example, the logical entity of a first MLD) may assign MPDUs with SNs 1-5 to STA x and MPDUs with SNs 6-10 to STA y.

In block 1006, the logical entity of the first MLD receives one or more BA status reports from at least one of the first STA or the second STA indicating a state of each MPDU in the first set of one or more MPDUs assigned to the first STA and a state of each MPDU in the second set of one or more MPDUs assigned to the second STA, wherein the state of each MPDU is indicated as a state value selected from one of at least four state values. In block 1008, the logical entity of the first MLD updates a common scoreboard used to track the states of the one or more MPDUs in the first set transmitted across the first wireless link and the one or more MPDUs in the second set transmitted across the second wireless link, based on the one or more BA status reports. As illustrated in FIG. 12, the MAC SAP may receive a BA status report from STA x, with status information for both MPDUs (SNs 1-5) assigned to STA x as well as MPDUs (SNs 6-10) assigned to STA y. As shown, the BA status report may have more detailed status than conventional status reports.

The MLD framework described herein may allow for faster MPDU status updates at the MAC SAP. For example, while each STA (such as, STA x and STA y) at the lower MAC (L-MAC) may be expected to have a local retry policy for failed MPDUs, the STAs may report their MLD BA status to the MAC SAP in the upper MAC (U-MAC) layer without delaying until each STA has exhausted all retry attempts for failed MPDUs. In this manner, a STA at the L-MAC may provide frequent reports to the U-MAC so that U-MAC may advance the TX window, decide to discard MPDUs, and/or make re-allocation decisions, such as re-assigning MPDUs between STAs or changing the relative amount of MPDUs assigned to each STA.

Figure 11:
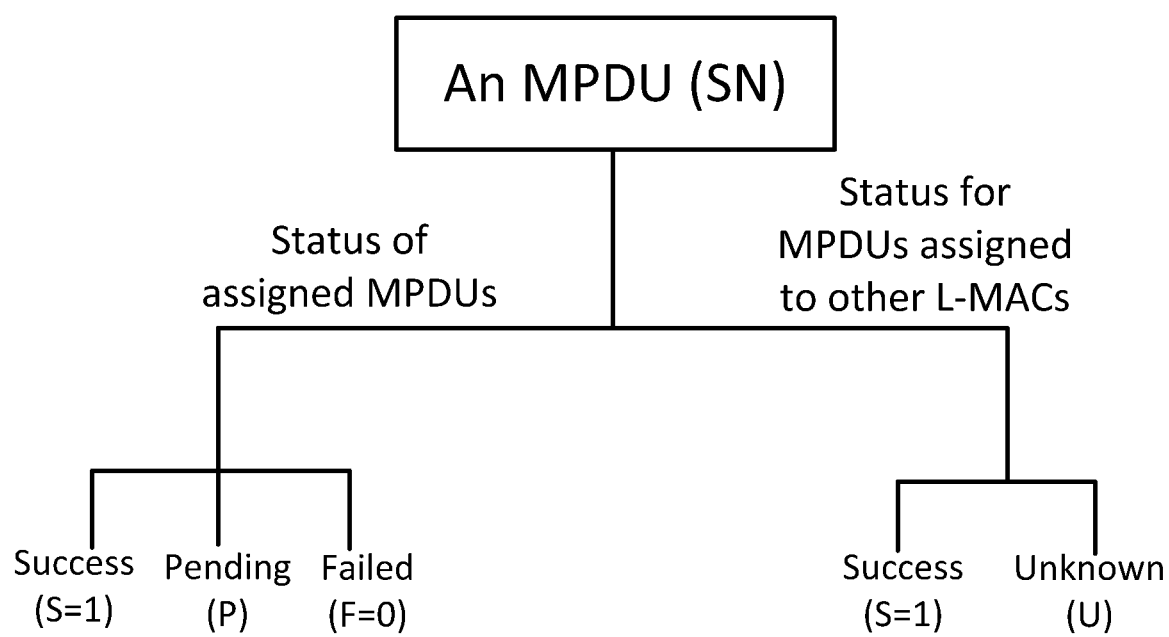
FIG. 11 shows example MPDU states according to some implementations.

As noted above, and as shown in FIG. 11, for MPDUs assigned to a particular (L-MAC) STA instance, the report to the U-MAC may have a first set of state values, while the MPDUs assigned to the other STA instance may have a second set of state values. For example, in the BA status report shown in FIG. 12, STA x may report state values of Success ("1"), Pending ("P"), or Failure ("0") for its own MPDUs (SNs 1-5), and report state values of Success ("1") or Unknown ("U") for MPDUs (SNs 6-10) assigned to STA y.

For MPDUs (SNs 1-5) assigned to STA x, a value of Success ("1") in the BA status report indicates the MPDU was successfully delivered, Pending ("P") indicates the L-MAC is attempting a retry or has yet to transmit the MPDU, Failed ("0") indicates the L-MAC was unable to successfully deliver the MPDU and has given up (perhaps after multiple retransmission attempts).

For MPDUs not assigned to STA x (SNs 6-10) (and assigned to STA y in FIG. 12), a value of Success ("1") indicates the MPDU was successfully delivered, while Unknown ("U") indicates the status of the MPDU is unknown (such as, STA y could have not yet transmitted that MPDU, the MPDU could be in transit, the MPDU is being re-transmitted, or the MPDU actually failed).

In some cases, the U-MAC entity (such as, MAC SAP) may assign the same MPDU (or MPDUs) to multiple STAs for transmission, for example, in an effort to increase reliability and/or decrease latency. For example, STA x and STA y may both be assigned the same MPDUs. In such cases, a receiving STA (such as, STA p) may receive RX status from another receiving STA (such as, STA q) for an MPDU that it (L-MAC A) has also received. In this case, the STA sending the BA report OTA (such as, STA p) may preserve the value of "1" (Success) for the MPDU when preparing the BA (i.e., sets the bit to "1" in the BA bitmap for that MPDU) if either STA p or STA q has successfully received that MPDU (for example, it may perform a logical OR on the status for that MPDU as reported by both STAs).

Referring again to FIG. 12, the U-MAC (such as, MAC SAP) may update the state for an MPDU (SN), in the BA scoreboard, based on the status from BA status reports received from STA x and/or STA y. In some cases, the MAC SAP may consolidate the information reported from multiple STAs.

For example, the MAC SAP may determine a status of Success ("1") from any L-MAC indicates the MPDU was successfully delivered. Conversely, the MAC SAP may determine a status of Failure ("0") in a BA status report from any assigned L-MAC indicates that the corresponding L-MAC was unable to deliver the MPDU (as noted above, the L-MAC may declare a failure after zero or multiple retry attempts).

Receiving a status of Pending ("P") from an assigned L-MAC indicates, to the MAC SAP, that the L-MAC STA instance has either yet to transmit the MPDU, the MPDU is in transit, or the L-MAC may attempt a local retry for that MPDU. Receiving a status of Unknown ("U") may indicate the L-MAC is reporting on behalf of another L-MAC and does not have enough information about the MPDUs status.

Figure 13:
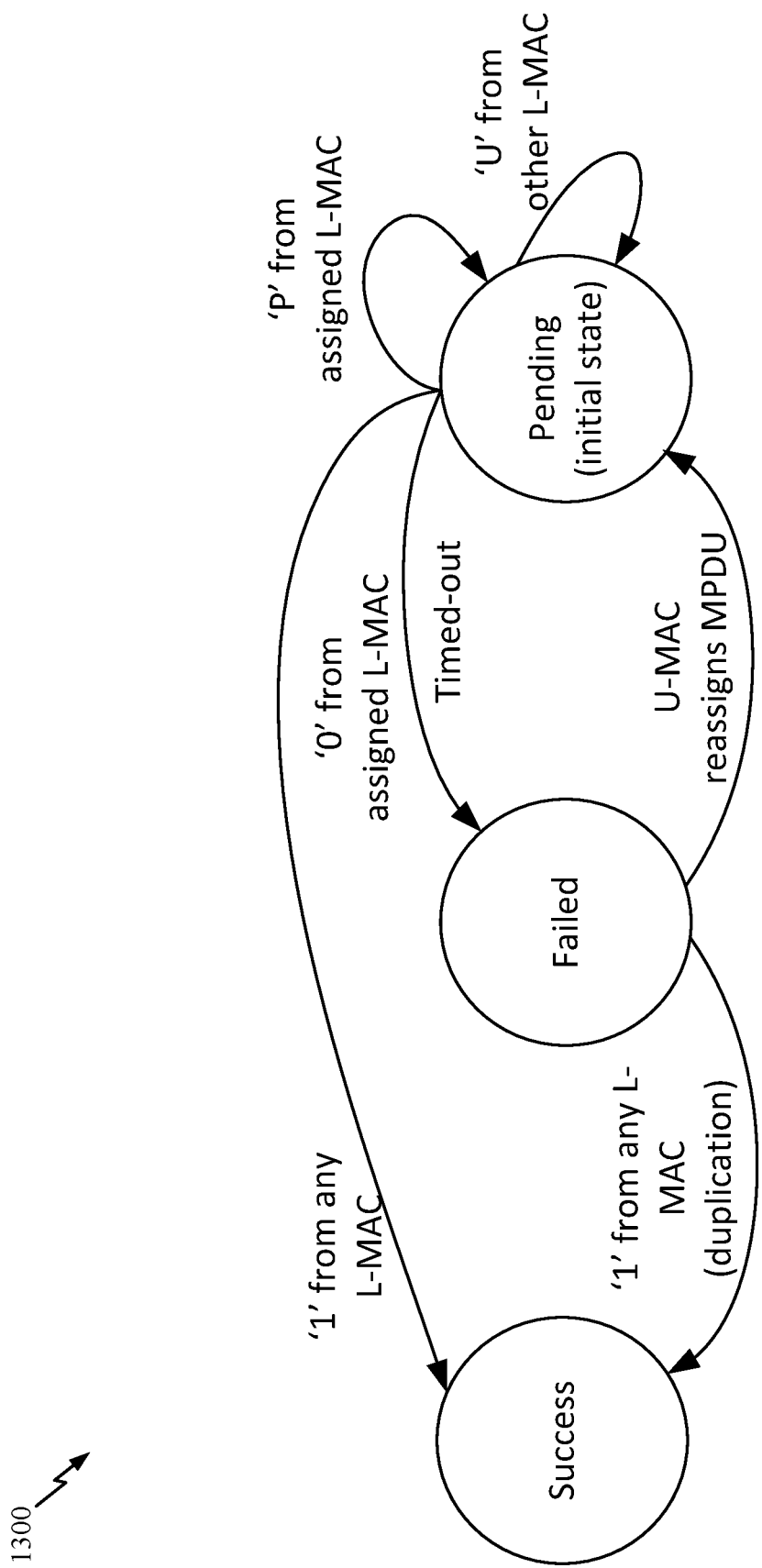
FIG. 13 shows an example state machine for MPDU states according to some implementations.

In some cases, the U-MAC (such as, MAC SAP) may utilize a state machine to maintain and update the status of assigned MPDU in the BA scoreboard. FIG. 13 illustrates an example state machine for MPDU states according to some implementations.

Upon assignment of MPDUs, by the U-MAC (such as, MAC SAP), to one or more STAs, each MPDU may be assigned a Pending ("P") status. The Pending ("P") status may be maintained if a BA status report (from the STA assigned that MPDU) indicates a Pending ("P") status or if a BA status report (from the STA not assigned that MPDU) indicates an Unknown ("U") status. The Pending ("P") status may be maintained until a report is received indicating that MPDU has been successfully received (which may be received from either STA), until a report is received indicating that the MPDU has failed (which may be received only from the assigned STA), or if a time out timer has expired. In some cases, a U-MAC (such as, MAC SAP) may associate a time out period for each assigned MPDU, and if the U-MAC doesn't receive a RX status of Success ("1") for that MPDU, the U-MAC may reassign the MPDU to a different L-MAC or decide to discard the MPDU (after max retry).

As illustrated in FIG. 13, in some cases, the U-MAC may change the status of an MPDU from Failed ("0") to Success ("1"). For example, if duplication is used (the same MPDU is assigned to both STAs), after one STA reports a Failure ("0"), the other STA may later report a Successful ("1") delivery. In some cases, the U-MAC may change the status of an MPDU from Failed ("0") to Pending ("P") (for example, after re-assigning a failed MPDU to from one STA to another).

In some cases, various mechanisms (which may be referred to as primitives) may be defined for the interface between each L-MAC and the U-MAC, to accommodate reporting of the "non-binary" MPDU state values described herein. For example, such primitives may allow the values corresponding to 1, 0, P or U to be passed, depending on the RX status for an MPDU and which L-MAC is reporting the status. Unlike the conventional BA status reporting scheme (with only values of "1" and "0"), the reporting of additional values (such as, "P" and "U") may require more than one bit to represent 4 states for an MPDU (of any given SN).

Figure 14:
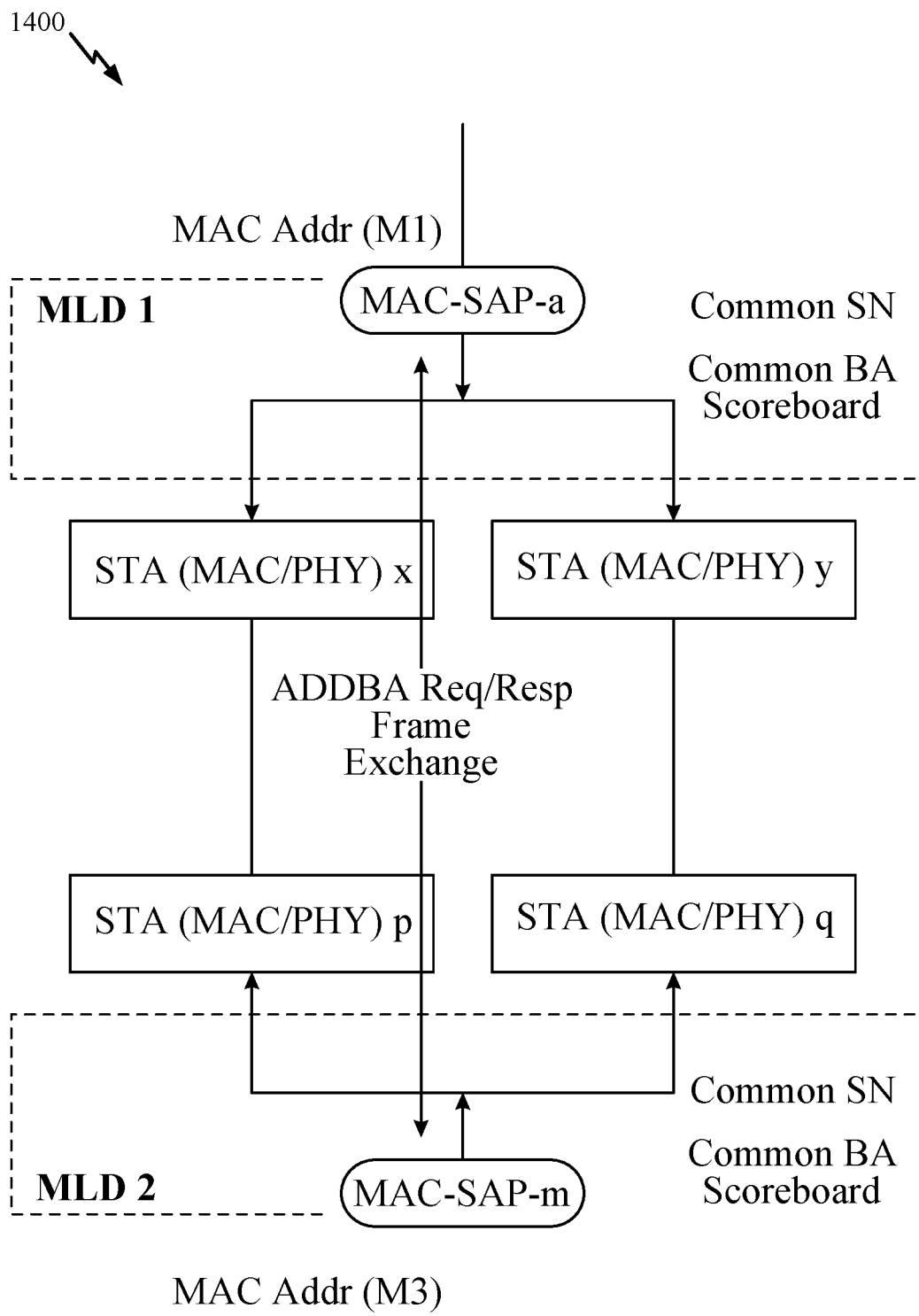
FIG. 14 shows an example setup for status reports involving an exchange of frames according to some implementations.

In some cases, MLD BA reporting may be configured using a negotiation involving an exchange of frames. FIG. 14 shows an example setup for status reports involving an exchange of frames according to some implementations. As shown in FIG. 14, request and response frames may be exchanged over one of the multiple links.

For single-link applications, generally, the BA setup may be done first, followed by BA reporting. For example, when a new TID flow is established between two devices (STAs), the devices may first perform a BA setup (such as, a request response exchange). Once MPDUs belonging to that TID flow are sent across, the originator (transmitter) may send a BA request (BAR) to solicit acknowledgement information (via a BA). Alternatively, the MPDUs may implicitly indicate/solicit an acknowledgement (without the need for a BAR). In this case, the recipient may send an acknowledgment (via a BA) after receiving the MPDUs. A field in the MPDU header may indicate whether the recipient should send an implicit acknowledgement or wait for a BAR.

A similar procedure may be used to setup BA reporting on multiple links for MLD scenarios. In this case, the exchange of request and response frames may be occur on one link, while the BA reporting may occur on multiple links.

FIGS. 15A and 15B show example request and response frame formats for setting up status reports according to some implementations. In some cases, the request and response frames may be frames referred to as Add BA (ADDBA) request and response frames. FIGS. 15A and 15B show example frame formats of ADDBA request and response frames, respectively. As shown, the request and response frames may each include an optional extension element.

Figure 16A:
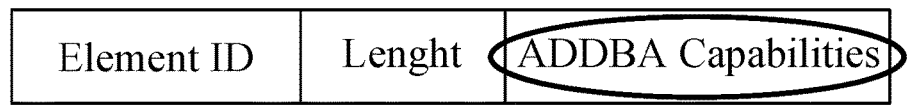
FIGS. 16A and 16B show an example extension element format and capabilities field format according to some implementations.
Figure 16B:
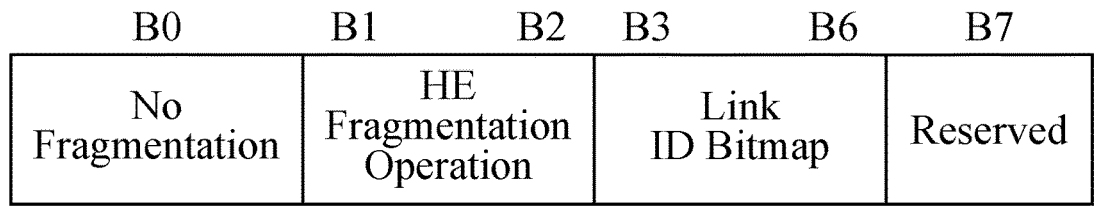

FIGS. 16A and 16B show an example extension element format and capabilities field format according to some implementations. As shown in FIG. 16A, the extension element may include an ADDBA capabilities field. As shown in FIG. 16 B, the ADDBA capabilities field may be extended to include a bitmap of a link ID to indicate which links a particular TID of this ADDBA request/response is affiliated with. For example, a common BA session for this TID may be established spanning the links identified by the Link ID Bitmap field. In some cases, the Link ID may be established during multi-link association/setup.

The BA setup (for example, shown in FIG. 14) may also establish a TID-to-link mapping. In some cases, the BA setup exchange may implicitly indicate which links the TID maps to. For example, if the multi-link setup spans 2.4 GHz (Link 1), 5 GHz (Link 2), and 6 GHz (Link 3), and BA setup for a particular TID indicates Links 1 and 3, then TID maps to the links on 2.4 GHz & 6 GHz.

In some cases, the TID-to-link mapping may be established via the ADDBA request and response frames (for example, via an optional ADDBA Extension element extended as shown in FIGS. 16A and 16B) as a negotiation. In other words, one MLD may initiate the request, specifying a first set of links, that may be accepted or changed by the peer (responding) MLD. For example, MLD 1 may indicate (for example, in its ADDBA request frame) Link ID 1 and Link ID 3, but the responding MLD may (for example, in its ADDBA response frame) indicate Link ID 1 and Link ID 2. In this case, MLD 1 may proceed with the BA session on Links ID 1 and 2 or send another request.

In some cases, a BA setup procedure may implicitly indicate a TID-to-link mapping. For example, if there are x links, a BA setup procedure may indicate that the corresponding TID flow is allowed on all or only on a subset (less than all) of the x links.

In some cases, a TID-to-link mapping may be altered by either MLD. For example, either an AP MLD or a non-AP MLD may initiate a change by sending an ADDBA Request frame (for example, indicating a change to a current mapping).

Figure 17:
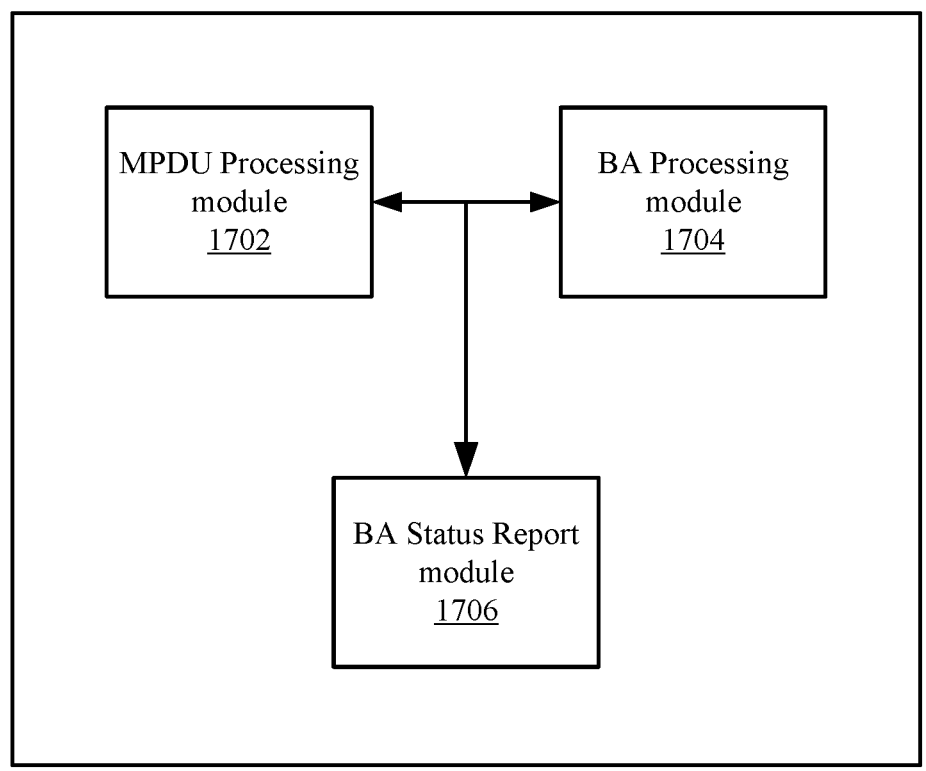
FIG. 17 shows a block diagram of an example wireless communication device according to some implementations.

FIG. 17 shows a block diagram of an example wireless communication device 1700 according to some implementations. In some implementations, the wireless communication device 1700 is configured to perform process 900 described above with reference to FIG. 9. The wireless communication device 1700 may be an example implementation of the wireless communication device 200 described above with reference to FIG. 2. For example, the wireless communication device 1700 can be a chip, SoC, chipset, package or device that includes at least one processor and at least one modem (for example, a Wi-Fi (IEEE 802.11) modem or a cellular modem). In some implementations, the wireless communication device 1700 can be a device for use in a STA, such as one of the STAs (such as, STA x or STA y) described above with reference to FIG. 12 or 14. In some other implementations, the wireless communication device 200 may be a STA that includes such a chip, SoC, chipset, package or device as well as at least one transmitter, at least one receiver, and at least one antenna.

The wireless communication device 1700 includes an MPDU Processing module 1702, a BA Processing module 1704, and a BA Status Report module 1706. Portions of one or more of the modules 1702, 1704, and 1706 may be implemented at least in part in hardware or firmware. For example, the modules 1702, 1704, and 1706 may be implemented at least in part by a modem (such as the modem 202). In some implementations, at least some of the modules 1702, 1704, and 1706 are implemented at least in part as software stored in a memory (such as the memory 208). For example, portions of one or more of the modules 1702, 1704, and 1706 can be implemented as non-transitory instructions (or "code") executable by a processor (such as the processor 206) to perform the functions or operations of the respective module.

Figure 18:
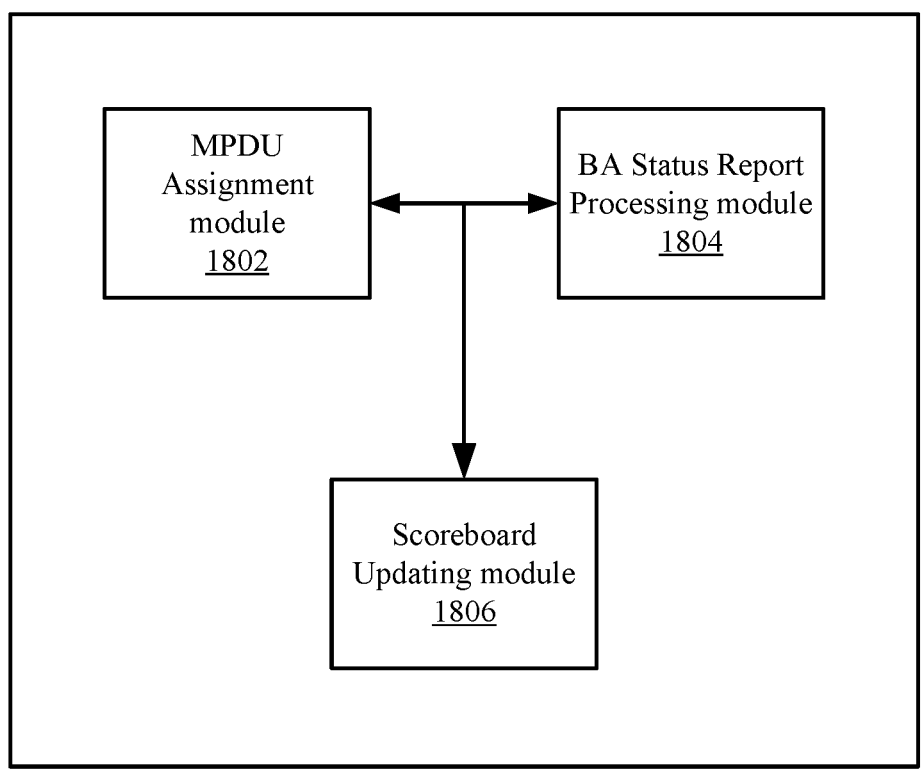
FIG. 18 shows a block diagram of an example wireless communication device according to some implementations.

FIG. 18 shows a block diagram of an example wireless communication device 1800 according to some implementations. In some implementations, the wireless communication device 1800 is configured to perform process 1000 described above with reference to FIG. 10. The wireless communication device 1800 may be an example implementation of the wireless communication device 200 described above with reference to FIG. 2. For example, the wireless communication device 1800 can be a chip, SoC, chipset, package or device that includes at least one processor and at least one modem (for example, a Wi-Fi (IEEE 802.11) modem or a cellular modem). In some implementations, the wireless communication device 1800 can implement a logical device, such as the MAC SAP described above with reference to FIG. 12 or 14. In some other implementations, the wireless communication device 200 may be a STA that includes such a chip, SoC, chipset, package or device as well as at least one transmitter, at least one receiver, and at least one antenna.

The wireless communication device 1800 includes an MPDU Assignment module 1802, a BA Status Report Processing module 1804, and a Scoreboard Updating module 1806. Portions of one or more of the modules 1802, 1804, and 1806 may be implemented at least in part in hardware or firmware. For example, the modules 1802, 1804, and 1806 may be implemented at least in part by a modem (such as the modem 202). In some implementations, at least some of the modules 1802, 1804, and 1806 are implemented at least in part as software stored in a memory (such as the memory 208). For example, portions of one or more of the modules 1802, 1804, and 1806 can be implemented as non-transitory instructions (or "code") executable by a processor (such as the processor 206) to perform the functions or operations of the respective module.

Example Aspects

Aspect 1: A method for wireless communications by a first multi-link device (MLD) that includes a first station (STA) and a second STA, the method comprising: transmitting, by the first STA of the first MLD to a third STA of a second MLD via a first wireless link between the first STA and the third STA, one or more first Medium Access Control (MAC) Protocol Data Unit (MPDUs) assigned to the first STA; transmitting, by the second STA of the first MLD to a fourth STA of the second MLD via a second wireless link between the second STA and the fourth STA, one or more second MPDUs assigned to the second STA; receiving, by the first STA of the first MLD from the third STA of the second MLD via the first wireless link, a block acknowledgment (BA) including a first set of one or more bits providing acknowledgment feedback for the one or more first MPDUs assigned to the first STA and a second set of one or more bits providing acknowledgment feedback for the one or more second MPDUs assigned to the second STA; determining a state of each of the one or more first MPDUs assigned to the first STA of the first MLD based on the first set of bits; determining a state of each of the one or more second MPDUs assigned to the second STA of the first MLD based on the second set of bits; generating a BA status report based on the determined states of the one or more first MPDUs assigned to the first STA and the determined states of the one or more second MPDUs assigned to the second STA; and providing the BA status report to a logical entity of the first MLD.

Aspect 2: The method of Aspect 1, wherein: the logical entity comprises a common MAC layer entity configured to assign one or more MPDUs to the first and second STA; and the method further comprises receiving an assignment of one or more MPDUs to the first STA from the common MAC layer entity.

Aspect 3: The method of Aspect 2, further comprising receiving, from the common MAC layer entity, a re-assignment of one or more MPDUs to the first STA based on one or more BA status reports received from at least one of the first or second STAs.

Aspect 4: The method of any of Aspects 1-3, wherein: the first STA has a policy for retransmitting one or more MPDUs that have corresponding bits of the first set of bits that indicate negative acknowledgments; and the first STA is configured to forward one or more updated BA status reports to the logical entity before exhausting a maximum number of retransmissions according to the policy.

Aspect 5: The method of any of Aspects 2-4, comprising transmitting an MPDU only once with no retransmissions if the maximum number of retransmissions is set to zero.

Aspect 6: The method of any of Aspects 1-5, wherein determining a state of each of the one or more MPDUs assigned to the first STA based on the first set of bits comprises: determining a state of an MPDU of the one or more MPDUs assigned to the first STA as successfully received by the second MLD based on a corresponding bit of the first set of bits indicating a positive acknowledgment; determining a state of an MPDU of the one or more MPDUs assigned to the first STA as pending based on a corresponding bit of the first set of bits indicating a negative acknowledgment and the first STA has yet to transmit the MPDU or is retransmitting the MPDU; and determining a state of an MPDU of the one or more MPDUs assigned to the first STA as failed based on a corresponding bit of the first set of bits indicating a negative acknowledgment and the first STA has transmitted the MPDU and is retransmitting the MPDU.

Aspect 7: The method of any of Aspects 1-6, wherein determining a state of each of the one or more MPDUs assigned to the second STA based on the second set of bits comprises: determining a state of an MPDU of the one or more MPDUs assigned to the second STA as successfully received by the second MLD based on a corresponding bit of the second set of bits indicating a positive acknowledgment; and determining a state of an MPDU of the one or more MPDUs assigned to the second STA as unknown based on a corresponding bit of the first set of bits indicating a negative acknowledgment.

Aspect 8: A method for wireless communications by a logical entity of a first multi-link device (MLD), comprising: assigning a first set of one or more Medium Access Control (MAC) Protocol Data Unit (MPDUs) to a first station (STA) of the first MLD for transmission on a first wireless link between the first STA and a third STA of a second MLD; assigning a second set of one or more MPDUs to a second STA of the first MLD for transmission on a second wireless link between the second STA and a fourth STA of the second MLD; receiving one or more block acknowledgment (BA) status reports from at least one of the first STA or the second STA indicating a state of each MPDU in the first set of one or more MPDUs assigned to the first STA and a state of each MPDU in the second set of one or more MPDUs assigned to the second STA, wherein the state of each MPDU is indicated as a state value selected from one of at least four state values; and updating a common scoreboard used to track the states of the one or more MPDUs in the first set transmitted across the first wireless link and the one or more MPDUs in the second set transmitted across the second wireless link, based on the one or more BA status reports.

Aspect 9: The method of Aspect 8, wherein: the first STA and second STA each have a policy for retransmitting MPDUs that have corresponding bits of the first set of bits that indicate negative acknowledgments; and the first STA and second STA are configured to forward one or more updated BA status reports to the logical entity before exhausting a maximum number of retransmissions according to the policy.

Aspect 10: The method of Aspect 8 or 9, wherein: the logical entity comprises a common MAC layer entity that assigns MPDUs to the first and second STAs; and the method further comprising assigning MPDUs to the first and second STAs based on the updated common scoreboard.

Aspect 11: The method of Aspect 10, further comprising re-assigning one or more MPDUs from the first STA to the second STA or from the second STA to the first STA based on the BA status reports.

Aspect 12: The method of any of Aspects 8-11, wherein the common scoreboard reflects the states of MPDUs associated with different sequence numbers (SNs).

Aspect 13: The method of any of Aspects 8-12, wherein the four state values comprise: a first value that indicates an MPDU of the one or more MPDUs assigned to the first STA or the second STA as successfully received by the second MLD; a second value that indicates an MPDU of the one or more MPDUs assigned to the first STA or the second STA as pending if the STA to which that MPDU is assigned has yet to transmit the MPDU or is retransmitting the MPDU; a third value that indicates an MPDU of the one or more MPDUs assigned to the first STA or the second STA as failed if the STA to which that MPDU is assigned has transmitted the MPDU and is not retransmitting the MPDU; and a fourth value that indicates a state of an MPDU of the one or more MPDUs assigned to the first STA or the second STA as unknown if the STA that generated the report is not assigned that MPDU and is unable to determine that MPDU was successfully received by the second MLD.

Aspect 14: The method of Aspect 13, wherein: receiving the one or more BA status reports comprises receiving one or more BA status reports from the first STA and one or more BA status reports from the second STA; and updating the common scoreboard includes consolidating the BA status reports from the first STA and the second STA.

Aspect 15: The method of any of Aspects 8-14, further comprising: transmitting, via at least one of the first STA or the second STA, a first frame to request the second MLD to send BAs for one or more MPDUs transmitted on multiple wireless links; and receiving, via at least one of the first STA or the second STA, a second frame, in response to the first frame, indicating the second MLD will send BAs for one or more MPDUs transmitted on the first and second wireless links.

Aspect 16: An apparatus for wireless communications by a first multi-link device (MLD) that includes a first station (STA) and a second STA, the apparatus comprising: at least one processor; and at least one memory communicatively coupled with the at least one processor and storing processor-readable code that, when executed by the at least one processor, is configured to: transmit, by the first STA of the first MLD to a third STA of a second MLD via a first wireless link between the first STA and the third STA, one or more first Medium Access Control (MAC) Protocol Data Unit (MPDUs) assigned to the first STA; transmit, by the second STA of the first MLD to a fourth STA of the second MLD via a second wireless link between the second STA and the fourth STA, one or more second MPDUs assigned to the second STA; receive, by the first STA of the first MLD from the third STA of the second MLD via the first wireless link, a block acknowledgment (BA) including a first set of one or more bits providing acknowledgment feedback for the one or more first MPDUs assigned to the first STA and a second set of one or more bits providing acknowledgment feedback for the one or more second MPDUs assigned to the second STA; determine a state of each of the one or more first MPDUs assigned to the first STA of the first MLD based on the first set of bits; determine a state of each of the one or more second MPDUs assigned to the second STA of the first MLD based on the second set of bits; generate a BA status report based on the determined states of the one or more first MPDUs assigned to the first STA and the determined states of the one or more second MPDUs assigned to the second STA; and provide the BA status report to a logical entity of the first MLD.

Aspect 17: The apparatus of Aspect 16, wherein: the logical entity comprises a common MAC layer entity configured to assign one or more MPDUs to the first and second STAs; and the memory and the one or more processors are further configured to receive an assignment of one or more MPDUs to the first STA from the common MAC layer entity.

Aspect 18: The apparatus of Aspect 17, wherein the memory and the one or more processors are further configured to receive, from the common MAC layer entity, a re-assignment of one or more MPDUs to the first STA based on one or more BA status reports received from at least one of the first or second STAs.

Aspect 19: The apparatus of any of Aspects 16-18, wherein: the first STA has a policy for retransmitting MPDUs that have corresponding bits of the first set of bits that indicate negative acknowledgments; and the first STA is configured to forward one or more updated BA status reports to a logical entity before exhausting a maximum number of retransmissions according to the policy.

Aspect 20: The apparatus of any of Aspects 17-19, wherein the memory and the one or more processors are further configured to transmit an MPDU only once with no retransmissions if the maximum number of retransmissions is set to zero.

Aspect 21: The apparatus of any of Aspects 16-20, wherein determining a state of each of the one or more MPDUs assigned to the first STA based on the first set of bits comprises: determining a state of an MPDU of the one or more MPDUs assigned to the first STA as successfully received by the second MLD based on a corresponding bit of the first set of bits indicating a positive acknowledgment; determining a state of an MPDU of the one or more MPDUs assigned to the first STA as pending based on a corresponding bit of the first set of bits indicating a negative acknowledgment and the first STA has yet to transmit the MPDU or is retransmitting the MPDU; and determining a state of an MPDU of the one or more MPDUs assigned to the first STA as failed based on a corresponding bit of the first set of bits indicating a negative acknowledgment and the first STA has transmitted the MPDU and is retransmitting the MPDU.

Aspect 22: The apparatus of any of Aspects 16-21, wherein determining a state of each of the one or more MPDUs assigned to the second STA based on the second set of bits comprises: determining a state of an MPDU of the one or more MPDUs assigned to the second STA as successfully received by the second MLD based on a corresponding bit of the second set of bits indicating a positive acknowledgment; and determining a state of an MPDU of the one or more MPDUs assigned to the second STA as unknown based on a corresponding bit of the first set of bits indicating a negative acknowledgment.

Aspect 23: An apparatus for wireless communications by a logical entity of a first multi-link device (MLD), comprising: at least one processor; and at least one memory communicatively coupled with the at least one processor and storing processor-readable code that, when executed by the at least one processor, is configured to: assign a first set of one or more Medium Access Control (MAC) Protocol Data Unit (MPDUs) to a first station (STA) of the first MLD for transmission on a first wireless link between the first STA and a third STA of a second MLD; assign a second set of one or more MPDUs to a second STA of the first MLD for transmission on a second wireless link between the second STA and a fourth STA of the second MLD; receive one or more block acknowledgment (BA) status reports from at least one of the first STA or the second STA indicating a state of each MPDU in the first set of one or more MPDUs assigned to the first STA and a state of each MPDU in the second set of one or more MPDUs assigned to the second STA, wherein the state of each MPDU is indicated as a state value selected from one of at least four state values; and update a common scoreboard used to track the states of the one or more MPDUs in the first set transmitted across the first wireless link and the one or more MPDUs in the second set transmitted across the second wireless link, based on the one or more BA status reports.

Aspect 24: The apparatus of Aspect 23, wherein: the first STA and second STA each have a policy for retransmitting MPDUs that have corresponding bits of the first set of bits that indicate negative acknowledgments; and the first STA and second STA are configured to forward one or more updated BA status reports to the logical entity before exhausting a maximum number of retransmissions according to the policy.

Aspect 25: The apparatus of Aspect 23 or 24, wherein: the logical entity comprises a common MAC layer entity that assigns MPDUs to the first and second STAs; and the memory and the one or more processors are further configured to assign MPDUs to the first and second STAs based on the updated common scoreboard.

Aspect 26: The apparatus of Aspect 25, wherein the memory and the one or more processors are further configured to re-assign one or more MPDUs from the first STA to the second STA or from the second STA to the first STA based on the BA status reports.

Aspect 27: The apparatus of any of Aspects 23-26, wherein the common scoreboard reflects the states of MPDUs associated with different sequence numbers (SNs).

Aspect 28: The apparatus of any of Aspects 23-27, wherein the four state values comprise: a first value that indicates an MPDU of the one or more MPDUs assigned to the first STA or the second STA as successfully received by the second MLD; a second value that indicates an MPDU of the one or more MPDUs assigned to the first STA or the second STA as pending if the STA to which that MPDU is assigned has yet to transmit the MPDU or is retransmitting the MPDU; a third value that indicates an MPDU of the one or more MPDUs assigned to the first STA or the second STA as failed if the STA to which that MPDU is assigned has transmitted the MPDU and is not retransmitting the MPDU; and a fourth value that indicates a state of an MPDU of the one or more MPDUs assigned to the first STA or the second STA as unknown if the STA that generated the report is not assigned that MPDU and is unable to determine that MPDU was successfully received by the second MLD.

Aspect 29: The apparatus of Aspect 28, wherein: receiving the one or more BA status reports comprises receiving one or more BA status reports from the first STA and one or more BA status reports from the second STA; and updating the common scoreboard includes consolidating the BA status reports from the first STA and the second STA.

Aspect 30: The apparatus of any of Aspects 23-29, wherein the memory and the one or more processors are further configured to: transmit, via at least one of the first STA or the second STA, a first frame to request the second MLD to send BAs for one or more MPDUs transmitted on multiple wireless links; and receive, via at least one of the first STA or the second STA, a second frame, in response to the first frame, indicating the second MLD will send BAs for one or more MPDUs transmitted on the first and second wireless links.

Additional Considerations

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations. The claims are to be accorded the widest scope consistent with this disclosure, the principles, and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communication by a first multi-link device (MLD) that includes a first station (STA) and a second STA, the method comprising:
   transmitting, by the first STA of the first MLD to a third STA of a second MLD via a first wireless link between the first STA and the third STA, one or more first Medium Access Control (MAC) Protocol Data Unit (MPDUs);
   transmitting, by the second STA of the first MLD to a fourth STA of the second MLD via a second wireless link between the second STA and the fourth STA, one or more second MPDUs;
   receiving, by the first STA of the first MLD from the third STA of the second MLD via the first wireless link, a first block acknowledgment (BA) including a first set of one or more bits providing receive status indicating positive or negative acknowledgement for the one or more first MPDUs, wherein the first BA further includes a third set of one or more bits providing receive status indicating positive acknowledgement for at least one second MPDU of the one or more second MPDUs when the receive status for the at least one second MPDU of the one or more second MPDUs is available at the third STA; and
   receiving, by the second STA of the first MLD from the fourth STA of the second MLD via the second wireless link, a second BA including a second set of one or more bits providing receive status indicating positive or negative acknowledgement for the one or more second MPDUs, wherein the second BA further includes a fourth set of one or more bits providing receive status indicating positive acknowledgement for at least one first MPDU of the one or more first MPDUs when the receive status for the at least one first MPDU of the one or more first MPDUs is available at the fourth STA.

2. The method of claim 1, wherein:
   the logical entity comprises a common MAC layer entity configured to assign one or more first MPDUs to the first STA and one or more second MPDUS to the second STA; and
   the method further comprises receiving an assignment of one or more first MPDUs to the first STA from the common MAC layer entity.

3. The method of claim 2, further comprising receiving, from the common MAC layer entity, a re-assignment of one or more MPDUs to the first STA based on one or more BA status reports received from at least one of the first or second STAs.

4. The method of claim 1, wherein:
   the first STA has a policy for retransmitting one or more first MPDUs that have corresponding bits of the first set of bits that indicate negative acknowledgments; and
   the first STA is configured to forward one or more updated BA status reports to the logical entity before exhausting a maximum number of retransmissions according to the policy, wherein the policy indicates that the maximum number of retransmissions is set to a nonzero value.

5. The method of claim 1, further comprising:
   determining a state of each of the one or more first MPDUs based on at least one of: the first set of bits or the fourth set of bits;
   determining a state of each of the one or more second MPDUs based on at least one of: the second set of bits or the third set of bits;
   generating a BA status report based on the determined states of the one or more first MPDUs and the determined states of the one or more second MPDUs; and
   providing the BA status report to a logical entity of the first MLD.

6. The method of claim 5, wherein determining a state of each of the one or more first MPDUs based on the first set of bits comprises:
   determining a state of an MPDU of the one or more first MPDUs as successfully received by the second MLD based on a corresponding bit of the first set of bits indicating a positive acknowledgment;
   determining a state of an MPDU of the one or more first MPDUs as pending based on a corresponding bit of the first set of bits indicating a negative acknowledgment and the first STA has yet to transmit the MPDU or is retransmitting the MPDU; and determining a state of an MPDU of the one or more first MPDUs as failed based on a corresponding bit of the first set of bits indicating a negative acknowledgment and the first STA has transmitted the MPDU and is not retransmitting the MPDU.

7. The method of claim 5, wherein determining a state of each of the one or more second MPDUs based on the second set of bits comprises:
determining a state of an MPDU of the one or more second MPDUs as successfully received by the second MLD based on a corresponding bit of the second set of bits indicating a positive acknowledgment; and
determining a state of an MPDU of the one or more second MPDUs as unknown based on a corresponding bit of the first set of bits indicating a negative acknowledgment.

8. A method for wireless communications by a logical entity of a first multi-link device (MLD), comprising:
assigning a first set of one or more Medium Access Control (MAC) Protocol Data Unit (MPDUs) to a first station (STA) of the first MLD for transmission on a first wireless link between the first STA and a third STA of a second MLD;
assigning a second set of one or more MPDUs to a second STA of the first MLD for transmission on a second wireless link between the second STA and a fourth STA of the second MILD;
receiving one or more block acknowledgment (BA) status reports from at least one of the first STA or the second STA indicating a state of each MPDU in the first set of one or more MPDUs assigned to the first STA and a state of each MPDU in the second set of one or more MPDUs assigned to the second STA, wherein the state of each MPDU is indicated as a state value selected from one of at least four state values, and wherein:
the one or more BA status reports comprises a first BA report and a second BA report,
the first BA report includes a first set of one or more bits providing receive status indicating positive or negative acknowledgement for the first set of one or more MPDUs and a third set of one or more bits providing receive status indicating positive acknowledgement for at least one second MPDU of the second set of one or more MPDUs when the receive status for the at least one second MPDU of the second set of one or more MPDUs is available at the third STA, and
the second BA report includes a second set of one or more bits providing receive status indicating positive or negative acknowledgement for the second set of one or more MPDUs and a fourth set of one or more bits providing receive status indicating positive acknowledgement for at least one first MPDU of the first set of one or more MPDUs when the receive status for the at least one first MPDU of the first set of one or more MPDUs is available at the fourth STA; and
updating a common scoreboard used to track the states of the one or more MPDUs in the first set transmitted across the first wireless link and the one or more MPDUs in the second set transmitted across the second wireless link, based on the one or more BA status reports.

9. The method of claim 8, wherein:
the first STA and second STA each have a policy for retransmitting one or more MPDUs of the first or second set that have corresponding bits that indicate negative acknowledgments; and
the first STA and second STA are configured to forward one or more updated BA status reports to the logical entity before exhausting a maximum number of retransmissions according to the policy.

10. The method of claim 8, wherein:
the logical entity comprises a common MAC layer entity that assigns MPDUs to the first and second STAs; and
the method further comprising assigning MPDUs to the first and second STAs based on the updated common scoreboard.

11. The method of claim 10, further comprising:
re-assigning one or more MPDUs of the first set from the first STA to the second STA based on the BA status reports; or
re-assigning one or more MPDUs of the second set from the second STA to the first STA based on the BA status reports.

12. The method of claim 8, wherein the common scoreboard reflects the states of the first and second sets of one or more MPDUs associated with different sequence numbers (SNs).

13. The method of claim 8, wherein the four state values comprise:
a first value that indicates an MPDU of the one or more MPDUs of the first set assigned to the first STA or one or more MPDUs of the second set assigned to the second STA as successfully received by the second MLD;
a second value that indicates an MPDU of the one or more MPDUs of the first set assigned to the first STA or one or more MPDUs of the second set assigned to the second STA as pending if the STA to which that MPDU is assigned has yet to transmit the MPDU or is retransmitting the MPDU;
a third value that indicates an MPDU of the one or more MPDUs of the first set assigned to the first STA or one or more MPDUs of the second set assigned to the second STA as failed if the STA to which that MPDU is assigned has transmitted the MPDU and is not retransmitting the MPDU; and
a fourth value that indicates a state of an MPDU of the one or more MPDUs of the first set assigned to the first STA or the one or more MPDUs of the second set assigned to the second STA as unknown if the STA that generated the report is not assigned that MPDU and is unable to determine that MPDU was successfully received by the second MLD.

14. The method of claim 13, wherein:
receiving the one or more BA status reports comprises receiving one or more BA status reports from the first STA and one or more BA status reports from the second STA; and
updating the common scoreboard includes consolidating the BA status reports from the first STA and the second STA.

15. The method of claim 8, further comprising:
transmitting, via at least one of the first STA or the second STA, a first frame to request the second MLD to send BAs for one or more MPDUs transmitted on multiple wireless links; and
receiving, via at least one of the first STA or the second STA, a second frame, in response to the first frame, indicating the second MLD will send BAs for one or more MPDUs transmitted on the first and second wireless links.

16. An apparatus for wireless communications by a first multi-link device (MLD) that includes a first station (STA) and a second STA, the apparatus comprising:
- at least one processor; and
- at least one memory communicatively coupled with the at least one processor and storing processor-readable code that, when executed by the at least one processor, is configured to:
  - transmit, by the first STA of the first MLD to a third STA of a second MLD via a first wireless link between the first STA and the third STA, one or more first Medium Access Control (MAC) Protocol Data Unit (MPDUs);
  - transmit, by the second STA of the first MLD to a fourth STA of the second MLD via a second wireless link between the second STA and the fourth STA, one or more second MPDUs;
  - receive, by the first STA of the first MLD from the third STA of the second MLD via the first wireless link, a first block acknowledgment (BA) including a first set of one or more bits providing receive status indicating positive or negative acknowledgement for the one or more first MPDUs, wherein the first BA further includes a third set of one or more bits providing receive status indicating positive acknowledgement for at least one second MPDU of the one or more second MPDUs when the receive status for the at least one second MPDU of the one or more second MPDUs is available at the third STA; and
  - receive, by the second STA of the first MLD from the fourth STA of the second MLD via second first wireless link, a second BA including a second set of one or more bits providing receive status indicating positive or negative acknowledgement for the one or more second MPDUs, wherein the second BA further includes a fourth set of one or more bits providing receive status indicating positive acknowledgement for at least one first MPDU of the one or more first MPDUs when the receive status for the at least one first MPDU of the one or more first MPDUs is available at the fourth STA.

17. The apparatus of claim 16, wherein: the logical entity comprises a common MAC layer entity configured to assign one or more first MPDUs to the first STA and one or more second MPDUs to the second STAs; and
- the memory and the one or more processors are further configured to receive an assignment of one or more first MPDUs to the first STA from the common MAC layer entity.

18. The apparatus of claim 17, wherein the memory and the one or more processors are further configured to receive, from the common MAC layer entity, a re-assignment of one or more MPDUs to the first STA based on one or more BA status reports received from at least one of the first or second STAs.

19. The apparatus of claim 16, wherein:
- the first STA has a policy for retransmitting one or more first MPDUs that have corresponding bits of the first set of bits that indicate negative acknowledgments; and
- the first STA is configured to forward one or more updated BA status reports to a logical entity before exhausting a maximum number of retransmissions according to the policy, wherein the policy indicates that the maximum number of retransmissions is set to a nonzero value.

20. The apparatus of claim 16, wherein the memory and the one or more processors are further configured to:
- determine a state of each of the one or more first MPDUs based on at least one of: the first set of bits or the fourth set of bits;
- determine a state of each of the one or more second MPDUs based on at least one of: the second set of bits or the third set of bits;
- generate a BA status report based on the determined states of the one or more first MPDUs and the determined states of the one or more second MPDUs; and
- provide the BA status report to a logical entity of the first MLD.

21. The apparatus of claim 20, wherein determining a state of each of the one or more first MPDUs based on the first set of bits comprises:
- determining a state of an MPDU of the one or more first MPDUs as successfully received by the second MLD based on a corresponding bit of the first set of bits indicating a positive acknowledgment;
- determining a state of an MPDU of the one or more first MPDUs as pending based on a corresponding bit of the first set of bits indicating a negative acknowledgment and the first STA has yet to transmit the MPDU or is retransmitting the MPDU; and
- determining a state of an MPDU of the one or more first MPDUs as failed based on a corresponding bit of the first set of bits indicating a negative acknowledgment and the first STA has transmitted the MPDU and is retransmitting the MPDU.

22. The apparatus of claim 20, wherein determining a state of each of the one or more second MPDUs based on the second set of bits comprises:
- determining a state of an MPDU of the one or more second MPDUs as successfully received by the second MLD based on a corresponding bit of the second set of bits indicating a positive acknowledgment; and
- determining a state of an MPDU of the one or more second MPDUs as unknown based on a corresponding bit of the first set of bits indicating a negative acknowledgment.

23. An apparatus for wireless communications by a logical entity of a first multi-link device (MLD), comprising:
- at least one processor; and
- at least one memory communicatively coupled with the at least one processor and storing processor-readable code that, when executed by the at least one processor, is configured to:
  - assign a first set of one or more Medium Access Control (MAC) Protocol Data Unit (MPDUs) to a first station (STA) of the first MLD for transmission on a first wireless link between the first STA and a third STA of a second MLD;
  - assign a second set of one or more MPDUs to a second STA of the first MLD for transmission on a second wireless link between the second STA and a fourth STA of the second MLD;
  - receive one or more block acknowledgment (BA) status reports from at least one of the first STA or the second STA indicating a state of each MPDU in the first set of one or more MPDUs assigned to the first STA and a state of each MPDU in the second set of one or more MPDUs assigned to the second STA, wherein the state of each MPDU is indicated as a state value selected from one of at least four state values, and wherein:
    - the one or more BA status reports comprises a first BA report and a second BA report, the first BA report includes a first set of one or more bits providing receive status indicating positive or negative acknowledgement for the first set of one or more MPDUs and a third set of one or more bits providing receive status indicating positive acknowledgement for at least one second MPDU of the second set of one or more MPDUs when the receive status for the at least one second MPDU of the second set of one or more MPDUs is available at the third STA, and the second BA report includes a second set of one or more bits providing receive status indicating positive or negative acknowledgement for the second set of one or more MPDUs and a fourth set of one or more bits providing receive status indicating positive acknowledgement for at least one first MPDU of the first set of one or more MPDUs when the receive status for the at least one first MPDU of the first set of one or more MPDUs is available at the fourth STA; and update a common scoreboard used to track the states of the one or more MPDUs in the first set transmitted across the first wireless link and the one or more MPDUs in the second set transmitted across the second wireless link, based on the one or more BA status reports.

24. The apparatus of claim 23, wherein:
the first STA and second STA each have a policy for retransmitting one or more MPDUs of the first set or second set that have corresponding bits that indicate negative acknowledgments; and
the first STA and second STA are configured to forward one or more updated BA status reports to the logical entity before exhausting a maximum number of retransmissions according to the policy.

25. The apparatus of claim 23, wherein:
the logical entity comprises a common MAC layer entity that assigns MPDUs to the first and second STAs; and
the memory and the one or more processors are further configured to assign MPDUs to the first and second STAs based on the updated common scoreboard.

26. The apparatus of claim 25, wherein the memory and the one or more processors are further configured to:
re-assign one or more MPDUs of the first set from the first STA to the second STA based on the BA status reports; or
re-assign one or more MPDUs of the second set from the second STA to the first STA based on the BA status reports.

27. The apparatus of claim 23, wherein the common scoreboard reflects the states of the first and second sets of one or more MPDUs associated with different sequence numbers (SNs).

28. The apparatus of claim 23, wherein the four state values comprise:
a first value that indicates an MPDU of the one or more MPDUs of the first set assigned to the first STA or one or more MPDUs of the second set assigned to the second STA as successfully received by the second MLD;
a second value that indicates an MPDU of the one or more MPDUs assigned to the first STA or one or more MPDUs of the second set assigned to the second STA as pending if the STA to which that MPDU is assigned has yet to transmit the MPDU or is retransmitting the MPDU;
a third value that indicates an MPDU of the one or more MPDUs of the first set assigned to the first STA or one or more MPDUs of the second set assigned to the second STA as failed if the STA to which that MPDU is assigned has transmitted the MPDU and is not retransmitting the MPDU; and
a fourth value that indicates a state of an MPDU of the one or more MPDUs of the first set assigned to the first STA or one or more MPDUs of the second set assigned to the second STA as unknown if the STA that generated the report is not assigned that MPDU and is unable to determine that MPDU was successfully received by the second MLD.

29. The apparatus of claim 28, wherein:
receiving the one or more BA status reports comprises receiving one or more BA status reports from the first STA and one or more BA status reports from the second STA; and
updating the common scoreboard includes consolidating the BA status reports from the first STA and the second STA.

30. The apparatus of claim 23, wherein the memory and the one or more processors are further configured to:
transmit, via at least one of the first STA or the second STA, a first frame to request the second MLD to send BAs for one or more MPDUs transmitted on multiple wireless links; and
receive, via at least one of the first STA or the second STA, a second frame, in response to the first frame, indicating the second MLD will send BAs for one or more MPDUs transmitted on the first and second wireless links.

* * * * *